United States Patent [19]
Yoshida et al.

[11] Patent Number: 5,907,728
[45] Date of Patent: May 25, 1999

[54] PHOTOGRAPHIC CAMERA AND METHOD OF AND DEVICE FOR DISTINGUISHING CONDITION OF USE OF PHOTOGRAPHIC FILM IN FILM MAGAZINE

[75] Inventors: Yutaka Yoshida; Naoyuki Nishinou, both of Saitama-ken, Japan

[73] Assignee: Fuji Photo Film Co., Ltd., Kanagawa-ken, Japan

[21] Appl. No.: 09/046,609

[22] Filed: Mar. 24, 1998

Related U.S. Application Data

[62] Division of application No. 08/808,675, Feb. 28, 1997, Pat. No. 5,812,894, which is a continuation of application No. 08/442,530, May 16, 1995, abandoned.

[30] Foreign Application Priority Data

May 24, 1994 [JP] Japan .................................. 6-109575
May 16, 1994 [JP] Japan .................................. 6-101194

[51] Int. Cl.⁶ .................................................. G03B 17/24
[52] U.S. Cl. ............................................................. 396/410
[58] Field of Search ................................... 396/387, 390, 396/406, 410

[56] References Cited

U.S. PATENT DOCUMENTS 5,701,539 12/1997 Amano ..................................... 396/410

*Primary Examiner*—David M. Gray
*Attorney, Agent, or Firm*—Sughrue, Mion, Zinn, Macpeak & Seas, PLLC

[57] ABSTRACT

A film magazine includes a spool which is supported for rotation in a magazine body and around which the roll film is wound, and a data disk which carries bar codes representing information inherent to the film magazine such as the ISO sensitivity, the number of exposure frames and the like of the film and is rotated together with the spool. The spool is held in a predetermined position when the film is completely in the magazine body so that the angular position of the spool relative to the magazine body represents the condition of use of the film. A photosensor is disposed in a fixed position to read the bar codes while rotating the spool and the condition of use of the film is distinguished on the basis of an angle by which the spool is rotated by the time the photosensor reads a predetermined particular point on the bar codes.

4 Claims, 25 Drawing Sheets

PHOTOGRAPHIC CAMERA AND METHOD OF AND DEVICE FOR DISTINGUISHING CONDITION OF USE OF PHOTOGRAPHIC FILM IN FILM MAGAZINE

This is a divisional of application Ser. No. 08/808,675, filed Feb. 28, 1997, now Pat. No. 5,812,894 which is a continuation of application Ser. No. 08/442,530, filed May 16, 1995, now abandoned.

BACKGROUND OF THE INVENTION

1. Field of the Invention

This invention relates to a photographic camera and a method of and a device for distinguishing the condition of use of a film in a film magazine.

2. Description of the Prior Art

There has been known a film magazine in which a data disk carrying thereon bar codes representing information inherent to the film magazine such as the ISO sensitivity, the number of exposure frames and the like of the film is provided to rotate integrally with the spool. The bar codes comprise a plurality of bars of a low reflectivity and spaces of a high reflectivity which are alternately arranged in the direction of rotation of the data disk. Further a particular portion such as a black quiet zone showing a data read begin position or a data read end position is provided at the leading end and/or the trailing end of the bar codes.

Further there has been known a photographic camera in which a film magazine provided with such a data disk is loaded as disclosed, for instance, in U.S. Pat. No. 5,025,274. The camera disclosed in the United States patent is provided with a photosensor for reading the bar codes, and the bar codes are read by the photosensor while the film is initially set. The camera automatically adjusts various mechanisms in the camera such as the stop on the basis of the data read by the photosensor.

In such a film magazine, no part of the film projects outside the magazine body except when the film is exposed to take a picture, and accordingly whether or not the film has been exposed cannot be known from the appearance of the film magazine. Thus there has been proposed a film magazine which is provided with an indicator which indicates the condition of use of the film in the magazine, that is, whether the film is virgin, the film has been partly exposed or the film has been fully exposed. See, for instance, U.S. Pat. Nos. 5,049,912; 5,049,913 and 5,047,794.

As the indicator, there have been disclosed, for instance, in Japanese Unexamined Patent Publication No. 5(1993)-313234, one which points one of a plurality of marks provided on the magazine body, the marks representing different conditions of use, and one in which a part of the data disk doubles as the indicator. When the film magazine provided with such an indicator is taken out from the camera, the film is fully retracted in the magazine body irrespective of the condition of use of the film and the spool is positioned in a predetermined angular position according to the condition of use of the film, which causes the indicator to point the mark corresponding to the condition of use. Accordingly the condition of use of the film can be known from the position of the indicator.

However, some user can overlook the indicator and load a fully exposed film magazine in the camera without knowing that the film has been fully exposed. In such a case, the camera naturally does not operate but the user can mistake it for a failure of the camera.

Further there also has been known a camera in which a film magazine having a data disk provided with a cutaway portion indicating the condition of use of the film is loaded and in which a mechanical sensor is provided to be brought into abutment against the cutaway portion when the film magazine is loaded. When the data disk is rotated in response to rewind of the film and the sensor detects the cutaway portion, the spool drive shaft is stopped. However this camera is disadvantageous in that a larger space is required in a camera body to accommodate the mechanical sensor in addition to the photosensor for reading the bar codes and the manufacturing cost increases due to increase in the number of parts. Further information on the condition of use of the film can be expressed only by the presence or absence of the cutaway portion and only two conditions of use can be expressed.

Thus there has been a demand for a method and a device which can distinguish three or more conditions of use of the film with a simple structure in a short time.

In a motor-driven camera, the film is generally rewound into the magazine after all the frames are exposed. The driving motor is kept driven for a predetermined time after the film counter comes to show 0 so that the film is completely rewound into the magazine.

Recently there has been proposed a film magazine of novel type having a light-shielding door which opens and closes a film exit slit. See, for instance, U.S. Pat. Nos. 5,049,912; 5,049,913 and 5,047,794. The film magazine of this type is provided with a spool which is rotatably supported in a magazine body and around which a film is wound and when the light-shielding door is opened, the spool is permitted to rotate relative to the magazine body to feed the film in and out the magazine body. When the door is closed, the film is wound into the magazine body and at the same time the inner space of the magazine body is closed in a light-tight fashion. Further the film magazine is provided with a data disk carrying thereon information inherent to the film magazine such as the ISO sensitivity, the number of exposure frames and the like of the film to be rotated together with the spool.

Also in the case of a photographic camera using the film magazine of this type, the driving motor must be kept driven for a predetermined time after the film counter comes to show 0 so that the film is completely rewound into the magazine as in a photographic camera using a conventional 135 film (35 mm film).

The predetermined time by which the motor is kept driven after the film counter comes to show 0 is generally set sufficiently longer than the time which is normally required for the film to be completely rewound into the magazine body taking into account a reduction in a motor speed and the like due to, for instance, a low ambient temperature. Accordingly, in the normal environment, the rewinding operation can be continued in vain even after the film is completely rewound into the magazine body, which causes the user to feel the rewinding time to be too long.

Especially when a whole roll of film is consumed in the course of photographing, it is preferred that the film magazines be changed as quickly as possible and accordingly film rewinding is required to be carried out in a shortest possible time.

Further from the viewpoint of saving power, it is not preferred that the motor is kept driven in vain.

SUMMARY OF THE INVENTION

In view of the foregoing observations and description, the primary object of the present invention is to provide a method and a device which can distinguish three or more conditions of use of the film in a film magazine with a simple structure in a short time.

Another object of the present invention is to provide a photographic camera in which the film in a film magazine can be surely rewound into the magazine body even if the film rewinding speed fluctuates due to, for instance, reduction in supply power to the motor and at the same time the film rewinding time is shortened by shortening the time by which the spool is rotated in vain after the film is completely rewound into the magazine body.

In accordance with a first aspect of the present invention, there is provided a method of distinguishing the condition of use of a roll film in a film magazine comprising a spool which is supported for rotation in a magazine body and around which the roll film is wound, and a data disk which carries bar codes representing information inherent to the film magazine such as the ISO sensitivity, the number of exposure frames and the like of the film and is rotated together with the spool, wherein the spool is stopped in a predetermined position when the film is completely in the magazine body so that the angular position of the spool relative to the magazine body represents the condition of use of the film, which method characterized by the steps of causing a bar code reading means disposed in a fixed position to read the bar codes while rotating the spool and distinguishing the condition of use of the film on the basis of an angle by which the spool is rotated by the time the bar code reading means reads a predetermined particular point on the bar codes.

In accordance with a second aspect of the present invention, there is provided a device for distinguishing the condition of use of a roll film in a film magazine comprising a spool which is supported for rotation in a magazine body and around which the roll film is wound, and a data disk which carries bar codes representing information inherent to the film magazine such as the ISO sensitivity, the number of exposure frames and the like of the film and is rotated together with the spool, wherein the spool is stopped in a predetermined position when the film is completely in the magazine body so that the angular position of the spool relative to the magazine body represents the condition of use of the film, which device comprising a drive means for rotating the spool, a bar code reading means which is disposed in a fixed position and reads the bar codes in response to rotation of the bar code, a rotational angle detecting means which detects a rotational angle by which the spool is rotated by the time the bar code reading means reads a predetermined particular point on the bar codes, and a distinguishing means which distinguishes the condition of use of the film on the basis of the rotational angle of the spool detected by the rotational angle detecting means.

The term "condition of use of the film" as used in this specification means whether the film is virgin and none of the exposure frames has been exposed, whether at least one of the exposure frames has been exposed, whether all the exposure frames have been exposed, whether the film has been developed or the like.

In accordance with a third aspect of the present invention, there is provided a photographic camera comprising a film rewinding means for rewinding a roll film into a film magazine body, a film end detecting means which detects the leading end of the film in the course of rewinding, a driving amount detecting means which detects the amount of drive by which the rewinding means is driven, a target driving amount calculating means which calculates a target amount of drive by which the rewinding means is to be driven after the leading end of the film is detected by the film end detecting means to completely rewind the film into the magazine body, and a rewind control means which causes the rewinding means to stop rewinding the film on the basis of comparison of the target amount of drive calculated by the target driving amount calculating means with the amount of drive of the rewinding means detected by the driving amount detecting means after the leading end of the film is detected by the film end detecting means.

That is, in accordance with the third aspect of the present invention, the film rewinding operation is controlled not on the basis of the time but on the basis of the amount of drive of the film rewinding means which is proportional to the length by which the film is actually rewound. Accordingly, the film can be surely rewound into the magazine body even if the rewinding rate fluctuates due to fluctuation in the supply voltage or the like, whereby necessity of continuing rewinding operation for a time longer than the time which is normally required for the film to be completely rewound into the magazine body can be eliminated.

For example, a target length by which the film is to be rewound after the leading end of the film is detected, i.e., the length of the portion of the film which is outside the magazine at the time the leading end is detected, can be known in advance and a target amount of drive by which the rewinding means is to be driven to rewind the film by the target length can be determined on experiment or by calculation. Accordingly, the rewinding operation may be terminated when the amount of drive of the rewinding means detected by the driving amount detecting means after the leading end of the film is detected by the film end detecting means reaches the target amount of drive.

The film rewinding means may be a mechanism for solely rewinding the film or a mechanism for feeding and rewinding.

The leading end of the film may be indirectly detected. For example, the leading end of the film may be indirectly detected by detecting a particular point on the film such as a perforation. Further the leading end of the film may be indirectly detected by way of a film counter which is rotated in response to rewind of the film so long as the film is in engagement therewith and is stopped when the film is disengaged therefrom, a film take-up spool or a film take-up sprocket.

The amount of drive of the film rewinding means may be detected, for instance, by counting encoder pulses which are generated every predetermined angle rotation of a driving motor. Further the amount of drive of the film rewinding means may be detected by detecting a rotational angle of a member which is rotated in response to drive of the film rewinding means. For instance, in the case of a film magazine having a data disk, the amount of drive of the film rewinding means can be detected by detecting the rotational angle of the data disk, for instance, by reading the bar codes on the data disk.

DESCRIPTION OF THE PREFERRED EMBODIMENT

Figure 1:
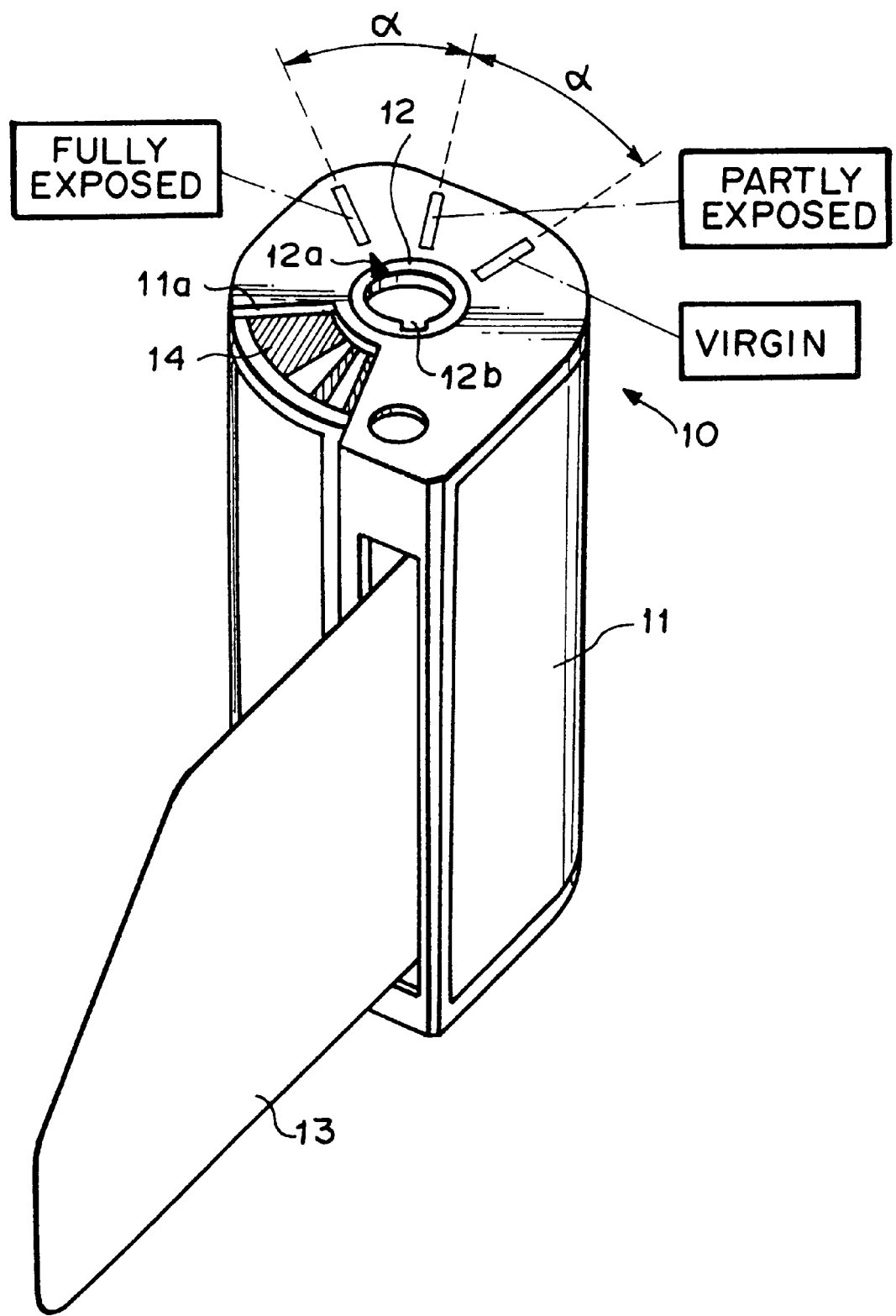
FIG. 1 is a perspective view showing a film magazine employed in a photographic camera in accordance with a first embodiment of the present invention.

In FIG. 1, a film magazine 10 comprises a magazine body 11, a spool 12 which is rotatably supported in the magazine body 11 and around which a film 13 is wound, and a shutter (not shown) which opens and closes a film exit slit. When the shutter is opened, the spool 12 is permitted to rotate relative to the magazine body 11, and when the shutter is closed, the spool 12 is locked and at the same time the inner space of the magazine body 11 is closed in a light-tight fashion. A data disk 14 carrying thereon bar codes representing information inherent to the film magazine 10 such as the ISO sensitivity, the number of exposure frames and the like of the film 13 is integrally provided on the spool 13. A window 11a is formed on the upper end surface of the magazine body 11 in order to show the bar codes.

Signs representing "virgin", "partly exposed" and "fully exposed" are engraved on the upper end surface of the magazine body 11 at intervals of an angle α. An indicator 12a in the form of an arrow rotated integrally with the spool 12 points one of the signs and shows the condition of use of the film 13. The spool 12 is provided with a keyway 12b which is adapted to be engaged with a key 34a (FIG. 3) of a spool drive shaft 34 of a camera 70 in accordance with an embodiment of the present invention to be described later.

Figure 2A:
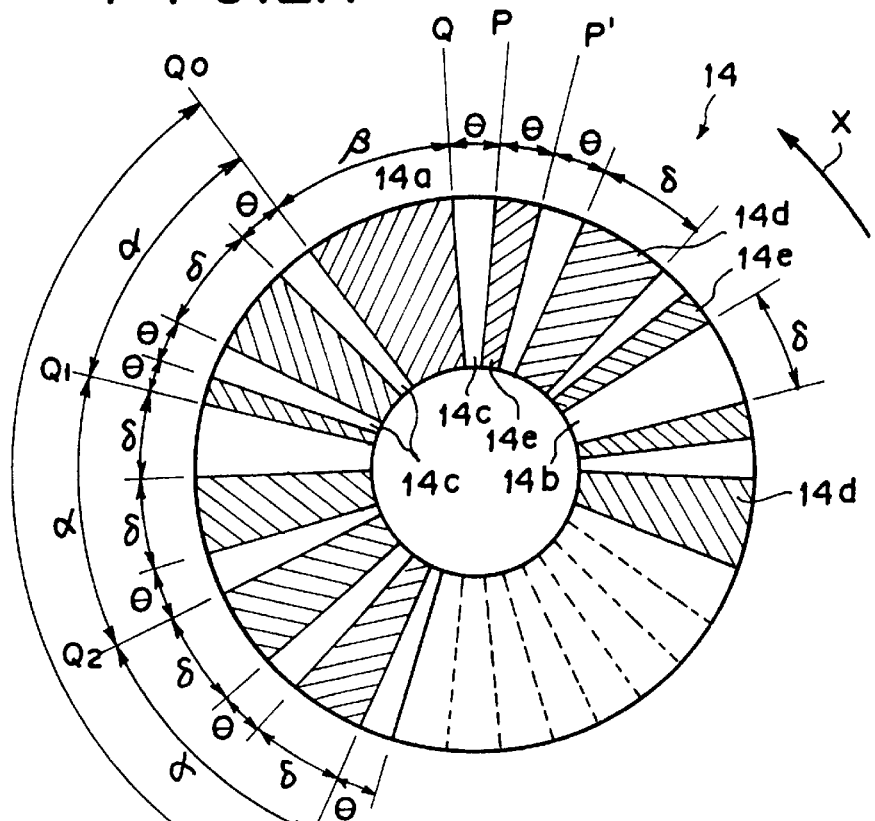
FIG. 2A is a view showing an example of the data disk.

FIG. 2A shows an example of the data disk 14. In the example shown in FIG. 2A, the bar codes comprise a plurality of black bars (hatched in FIG. 2A) of a low reflectivity and a plurality of a white bars (spaces) of a high reflectivity which radially extend about the center of the data disk 14. One of the black bars has a central angle β (black quiet zone 14a) and the spaces and the black bars are alternately arranged on opposite sides of the black quiet zone 14a with the spaces adjacent to the black quiet zone 14a on the both sides thereof. Some of the black bars and the spaces have a central angle of θ and the other black bars and the spaces have a central angle of δ, wherein δ=2θ. The spaces adjacent to the black quiet zone 14a have a central angle of θ. The wide (having a central angle of δ) spaces are indicated at 14b and the narrow (having a central angle of θ) spaces are indicated at 14c. The wide (having a central angle of δ) black bars are indicated at 14d and the narrow (having a central angle of θ) black bars are indicated at 14e. The central angle β of the black quiet zone 14a is greatly larger than angles θ and δ (β>5θ).

The widths of the bars and the spaces represent logical values and desired information is recorded as a pattern of the wide and narrow bars and spaces. The black quiet zone 14a defines a reference position from which the bar codes are to be read and the bar codes are read clockwisely from the position Q between the black quiet zone 14a and the space on the right side of the black quiet zone 14a. The bar codes between the space on the right side of the black quiet zone 14a and the space on the left side of the same carries data on the film 13 such as the ISO sensitivity, the number of exposure frames and the like.

Figure 2B:
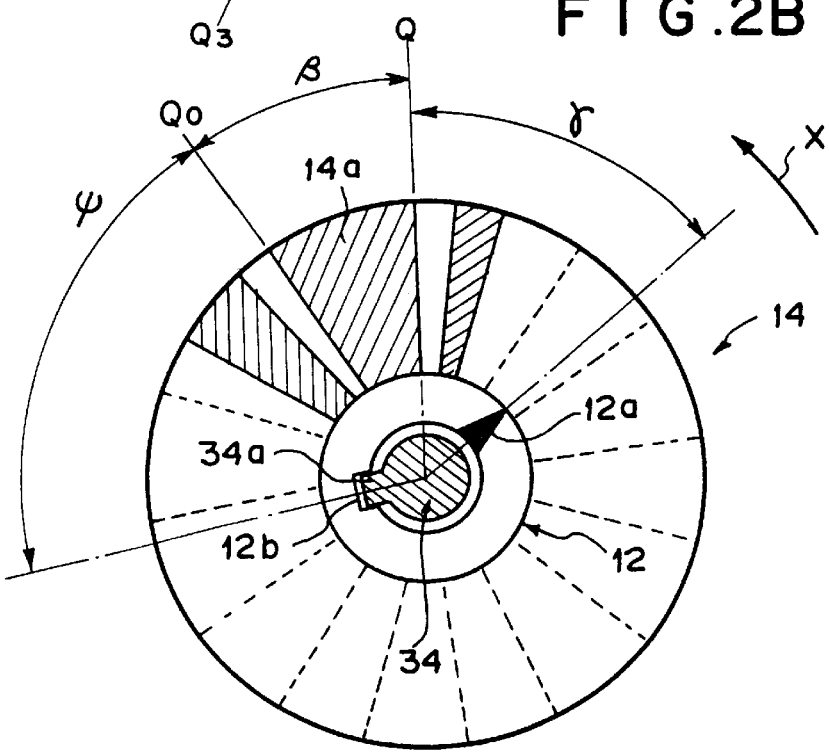
FIG. 2B is a schematic view for illustrating the operation of the camera.

Since the data disk 14 and the indicator 12a are both rotated integrally with the spool 12, the angular position of the data disk 14 relative to the indicator 12a and the keyway 12b is fixed. That is, as shown in FIG. 2B, the indicator 12a is constantly positioned rearward (as seen in the direction of rotation of the spool 12 shown by arrow X) of the trailing edge of the black quiet zone 14a (the read begin position Q) at angle γ, and the keyway 12b is constantly positioned forward of the leading edge (the read end position $Q_0$) of the black quiet zone 14a at angle ψ.

Figure 3:
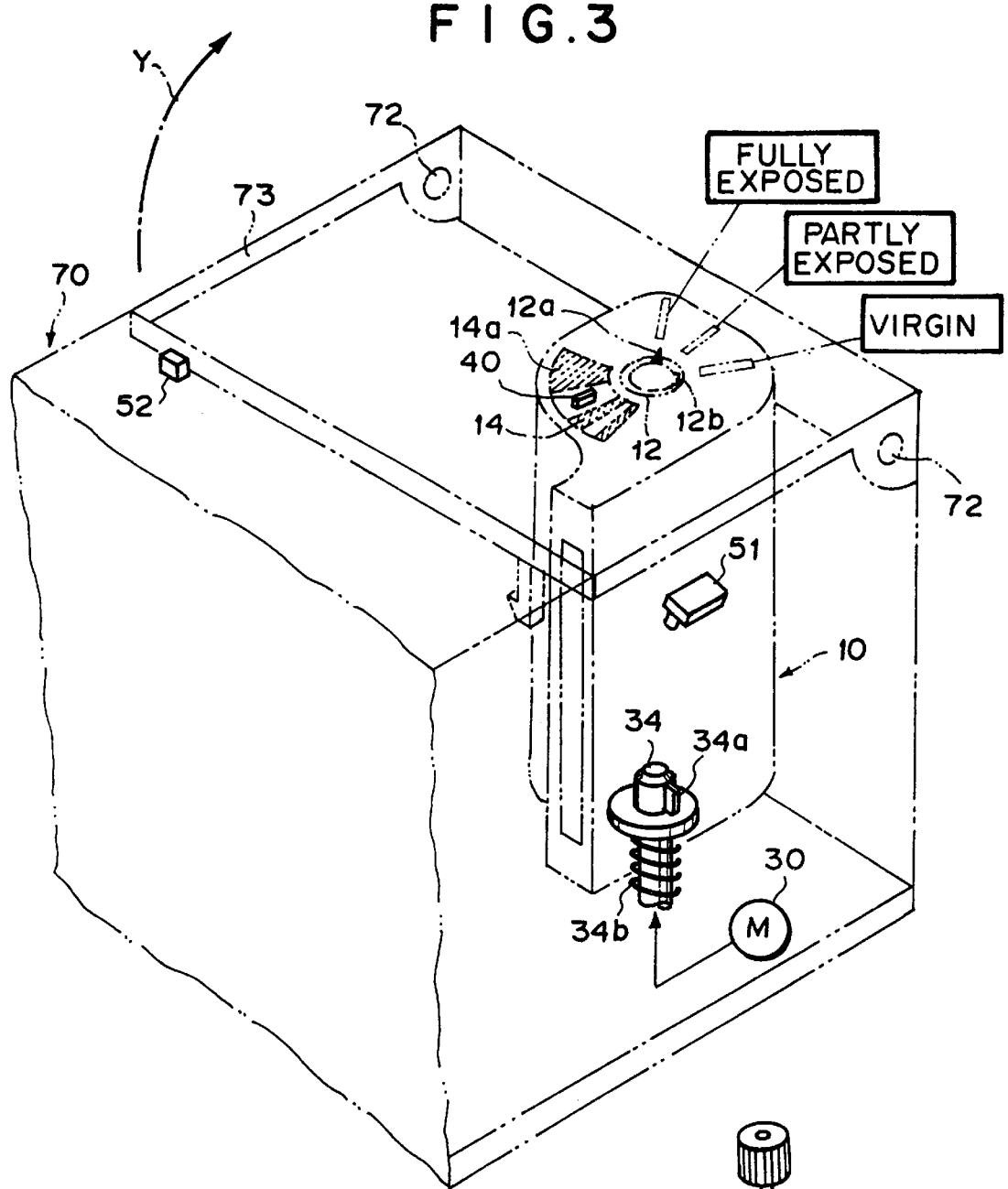
FIG. 3 is a fragmentary perspective view showing an important part of the camera of the first embodiment.

In FIG. 3, the photographic camera 70 has a film magazine chamber in which a film magazine 10 is loaded. A camera back 73 is hinged by pins 72 to the camera 70 to be rotatable in the direction of arrow Y. With the camera back 73 opened, the film magazine 10 is loaded in and unloaded from the camera 70. A camera back switch 52 for detecting opening and closure of the camera back 73 is provided on the camera 70. A magazine switch 51 which detects whether a film magazine 10 is in the magazine chamber is disposed on the inner surface of the magazine chamber.

Figure 5:
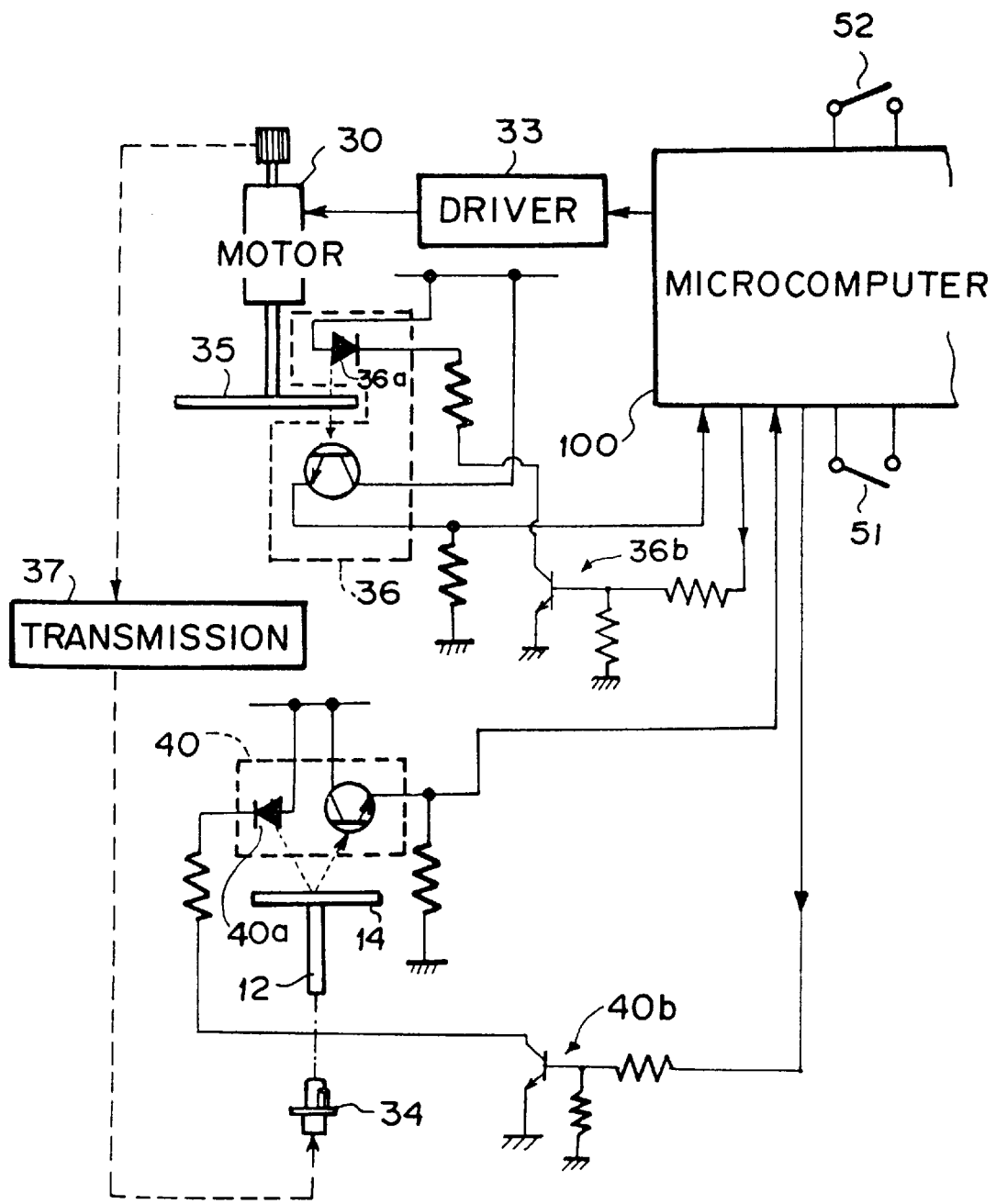
FIG. 5 is a block diagram of the electric circuit of the camera.

A spool drive shaft 34 for driving the spool 12 of the film magazine 10 loaded in the magazine chamber projects into the magazine chamber through the bottom of the camera 70. The shaft 34 is urged upward by a spring 34b and driven by an electric motor 30 by way of a driving force transmission mechanism 37 (FIG. 5). A key 34a which is adapted to be engaged with the keyway 12b formed in the spool 12 is formed on the peripheral surface of the shaft 34. When the film magazine 10 is loaded in the magazine chamber with the key 34a out of alignment with the keyway 12b, the shaft 34 is pushed down by the spool 12 overcoming the force of the spring 34b, and then when the shaft 34 is rotated by the motor 30 and the key 34a is brought into alignment with the keyway 12b, the shaft 34 is permitted to be moved upward under the force of the spring 34b to be brought into engagement with the spool 12.

After the shaft 34 is engaged with the spool 12, the spool 12 and the data disk 14 are rotated integrally with the shaft 34 and accordingly, the key 34a of the spool drive shaft 34 is constantly positioned forward of the trailing edge (the read begin position $Q_0$) of the black quiet zone 14a at angle $\psi+\beta$.

A first photosensor 40 for reading the bar codes is mounted on the inner side of the camera back 73 in a position where, when a film magazine 10 whose film 13 is virgin (and accordingly whose indicator 12a is pointing the sign "virgin") is loaded in the magazine chamber, the first photosensor 40 sees position Q3 (FIG. 2A) which is angularly spaced from the read end position $Q_0$ by $3\alpha$. Accordingly, when a film magazine 10 whose film 13 has been partly exposed (and accordingly whose indicator 12a is pointing the sign "partly exposed") is loaded in the magazine chamber, the first photosensor 40 sees position Q2 which is angularly spaced from the read end position $Q_0$ by $2\alpha$, and when a film magazine 10 whose film 13 has been fully exposed (and accordingly whose indicator 12a is pointing the sign "fully exposed") is loaded in the magazine chamber, the first photosensor 40 sees position Q1 which is angularly spaced from the read end position $Q_0$ by $\alpha$.

Figure 4:
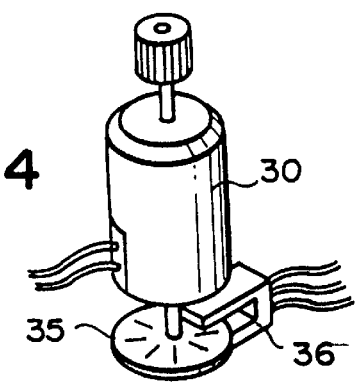
FIG. 4 is a perspective view showing a rotary encoder.

As shown in FIG. 4, a rotary encoder 35 is mounted on the output shaft of the motor 30. The rotary encoder 35 is provided with a plurality of slits arranged in a circle at predetermined intervals. A LED (light emitting diode) 36a (FIG. 5) and a second photosensor 36 are disposed on opposite sides of the rotary encoder 35 and a light beam emitted from the LED 36a and passing through the slit passing between the LED 36a and the second photosensor 36 is received by the second photosensor 36 as a light pulse. A microcomputer 100 counts the number of the light pulses detected by the second photosensor 36 and calculates the angle by which the motor 30 (i.e., the spool 12 and the data disk 14) is rotated by the time the first photosensor 40 detects the black quiet zone 14a. Then the microcomputer 100 determines the condition of use of the film 13 in the film magazine 10 loaded according to the angle calculated. The microcomputer 100 is provided therein a RAM storing therein variables necessary for the process and a ROM in which programs necessary for the process are recorded. FIG. 5 shows an electric circuit for determination of the condition of use of the film.

Figure 6:
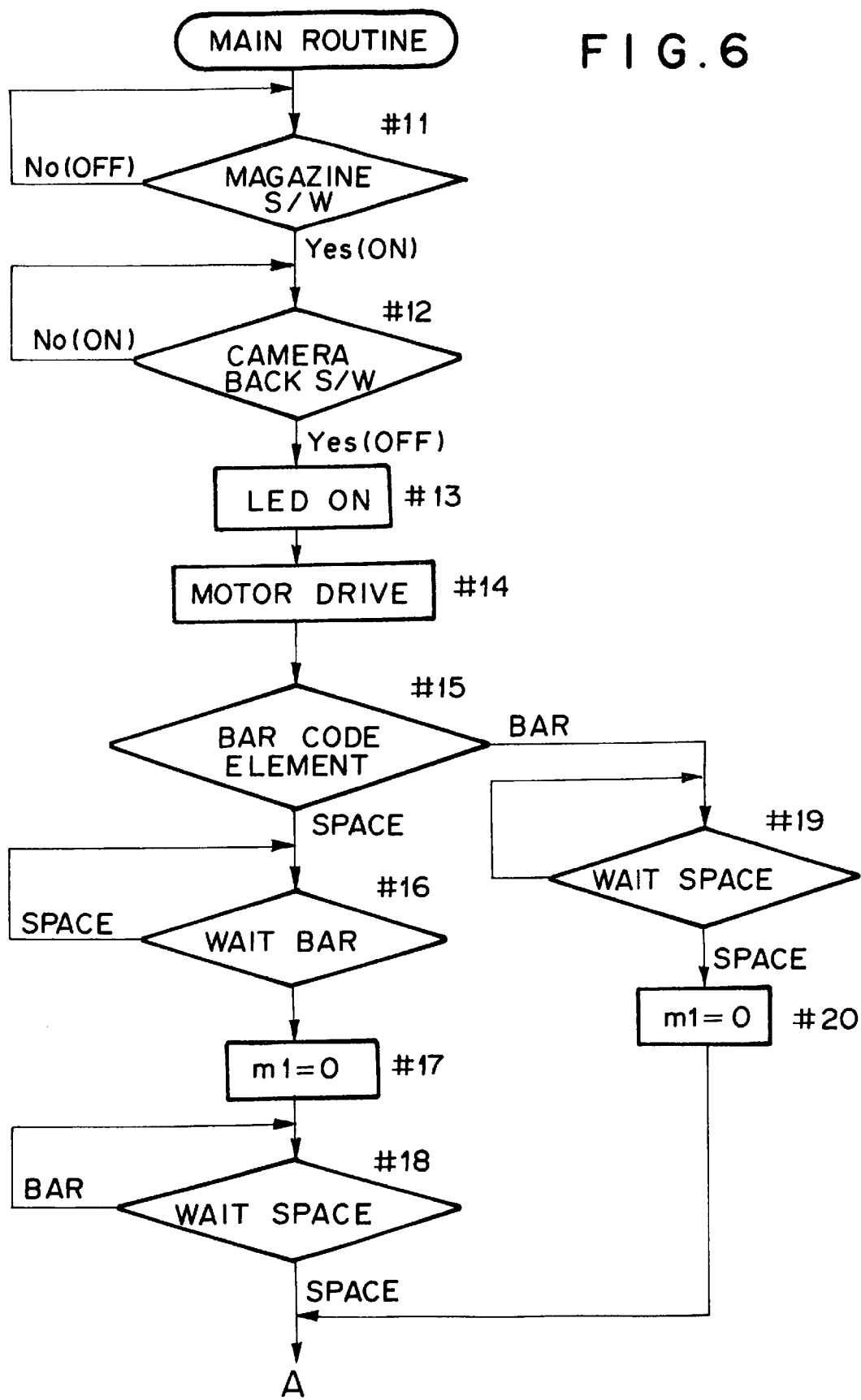
FIGS. 6 to 8 show a flow chart for illustrating the routine for distinguishing the condition of use of the film in the camera of the first embodiment.
Figure 7:
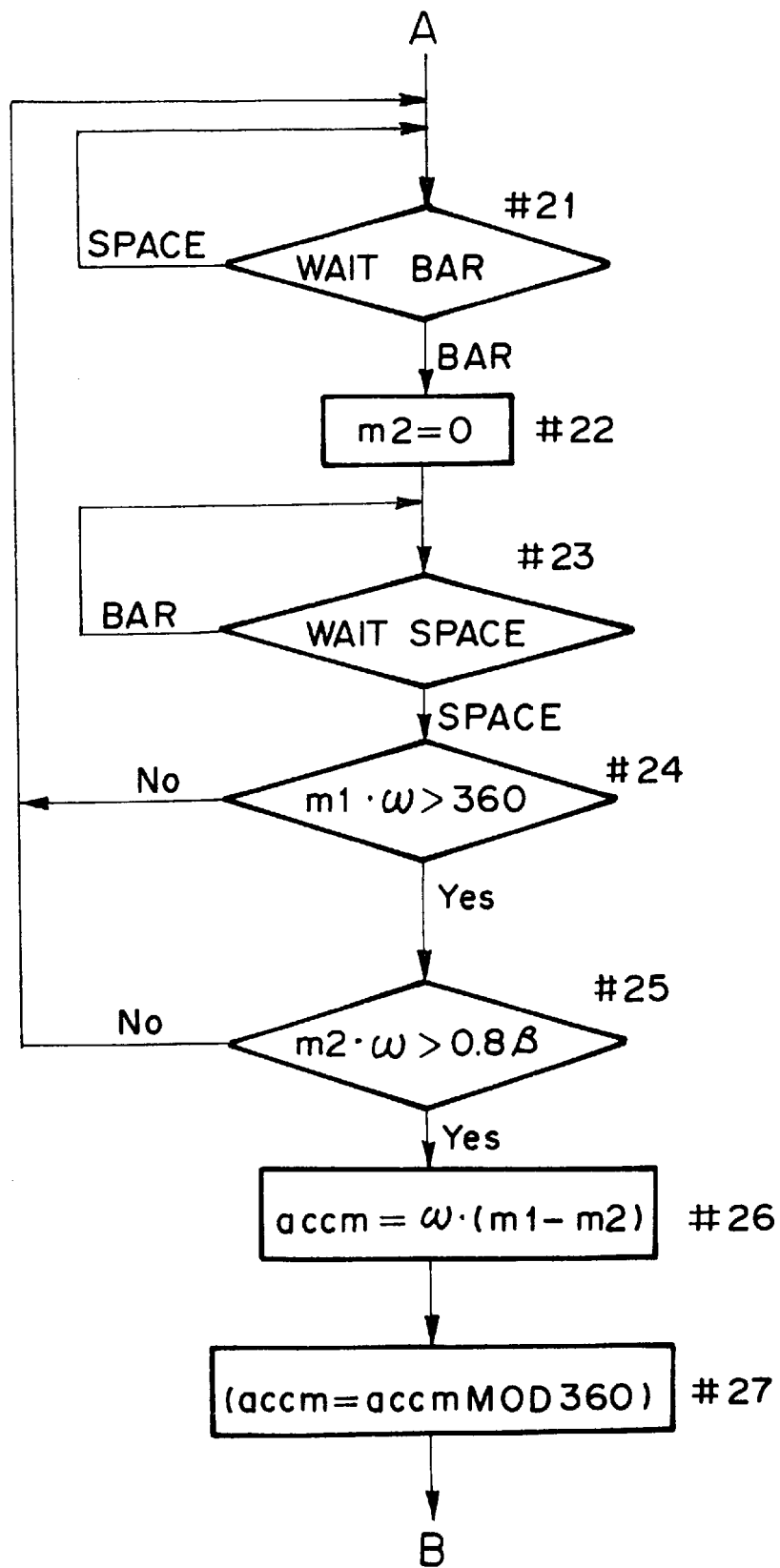
Figure 8:
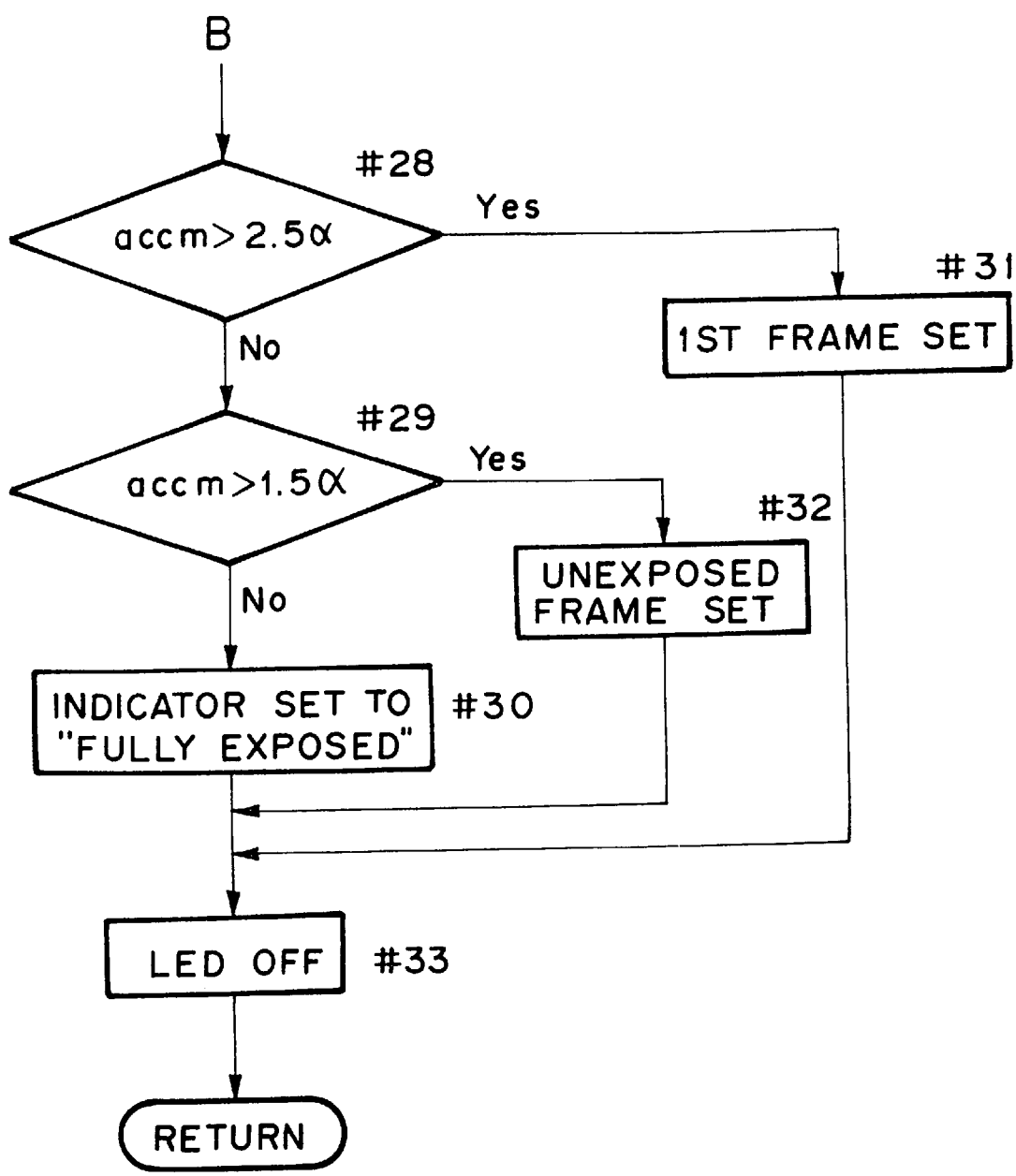

The operation of the camera 70 will be described with reference to the flow chart shown in FIGS. 6 to 8, hereinbelow.

When a film magazine 10 is loaded in the camera 70, the magazine switch 51 is turned on (step #11), and when the camera back 73 is closed, the camera back switch 52 is turned off (step #12). When the camera back switch 52 is turned off, switches 40b and 36b are turned on and LEDs 40a and 36a for the first and second photosensors 40 and 36 are energized. (step #13) Then the motor 30 is driven in the film rewinding direction (in the direction of arrow X in FIG. 2) and the spool drive shaft 34 is driven by way of the driving force transmission mechanism 37. (step #14) When the key 34a on the spool drive shaft 34 is not in alignment with the keyway 12b in the spool 12, the spool drive shaft 34 cannot engage with the spool 12 and accordingly the spool 12 is not rotated (the spool drive shaft 34 races). See the time chart shown in FIG. 16.

When the motor 30 is driven, the rotary encoder 35 on the output shaft of the motor 30 is integrally rotated with the motor 30 and the second photosensor 36 detects the pulse signals from the LED 36.

Then it is determined which the first photosensor 40 sees a bar or a space of the bar codes before the data disk 14 (or the spool 12) begins to rotate on the basis of the output of the first photosensor 40 which detects reflected light from the data disk 14. (step #15) When it is determined that the first photosensor 40 sees a space, the microcomputer 100 waits until the first photosensor 40 detects a bar (step #16) and then resets a first counter m1 counting the number of the pulses detected by the second photosensor 36 (step #17). Then the microcomputer 100 waits until the next space is detected by the first photosensor 40. (step #18) On the other hand, when it is determined in step #15 that the first photosensor 40 sees a bar, the microcomputer 100 waits until the first photosensor 40 detects a space (step #19) and then resets the first counter m1. (step #20).

That the microcomputer 100 waits until the bar is detected (in step #16) and until the space is detected (in step #19) means that the microcomputer 100 waits until the key 34a is brought into engagement with the keyway 12b and the spool 12 and the data disk 14 begin to rotate.

The first counter m1 reset in step #18 or #20 is thereafter incremented each time the second photosensor 36 detects a pulse so that the count of the first counter m1 represents the rotational angle of the spool 12 and the data disk 14 after they begin to rotate (more strictly after the spool 12 and the data disk 14 begin to rotate and transition, i.e., change from a bar to a space or from a space to bar, is detected).

Then the microcomputer 100 waits until the next bar is detected by the first photosensor 40 (step #21) and a second counter m2 counting the number of the pulses detected by the second photosensor 36 is reset (step #22). The second counter m2 is incremented each time the second photosensor 36 detects a pulse. The count of the second counter m2 represents the number of the pulses detected by the first photosensor 40 while the bar passes the first photosensor 40. The width of the bar is determined on the basis of the count of the second counter m2 and the black quiet zone 14a is detected on the basis of the count of the second counter m2.

If the data disk 14 is rotated before the key 34a is engaged with the keyway 12b, for instance, by friction between the spool drive shaft 34 and the spool, transition can be detected. In order to avoid this problem, the microcomputer 100 waits until the data disk 14 makes one rotation (step #24) and then detects the black quiet zone 14a (step #25). In FIG. 7, $\omega$ represents a constant which represents a rotational angle by which the data disk 14 or the spool 12 is rotated per one pulse. Accordingly, the product of the count of the first counter m1 and $\omega$ (m1×$\omega$) represents the total rotational angle of the data disk 14 and the product of the count of the second counter m2 and $\omega$ (m2×$\omega$) represents the width or the central angle of the bar passing the first photosensor 40.

When it is determined that the data disk 14 has made one rotation (step #24), the microcomputer 100 determines whether the bar which has just pass the first photosensor 40 is the black quiet zone 14a by determining whether (m2×$\omega$) is larger than 0.8$\beta$ (step #25). Though, in this embodiment, 80% of the central angle $\beta$ of the black quiet zone 14a is used for detection of the black quiet zone 14a, the value may be changed as desired so long as it is sufficiently large as compared with the central angles of the other bars.

Figure 16:
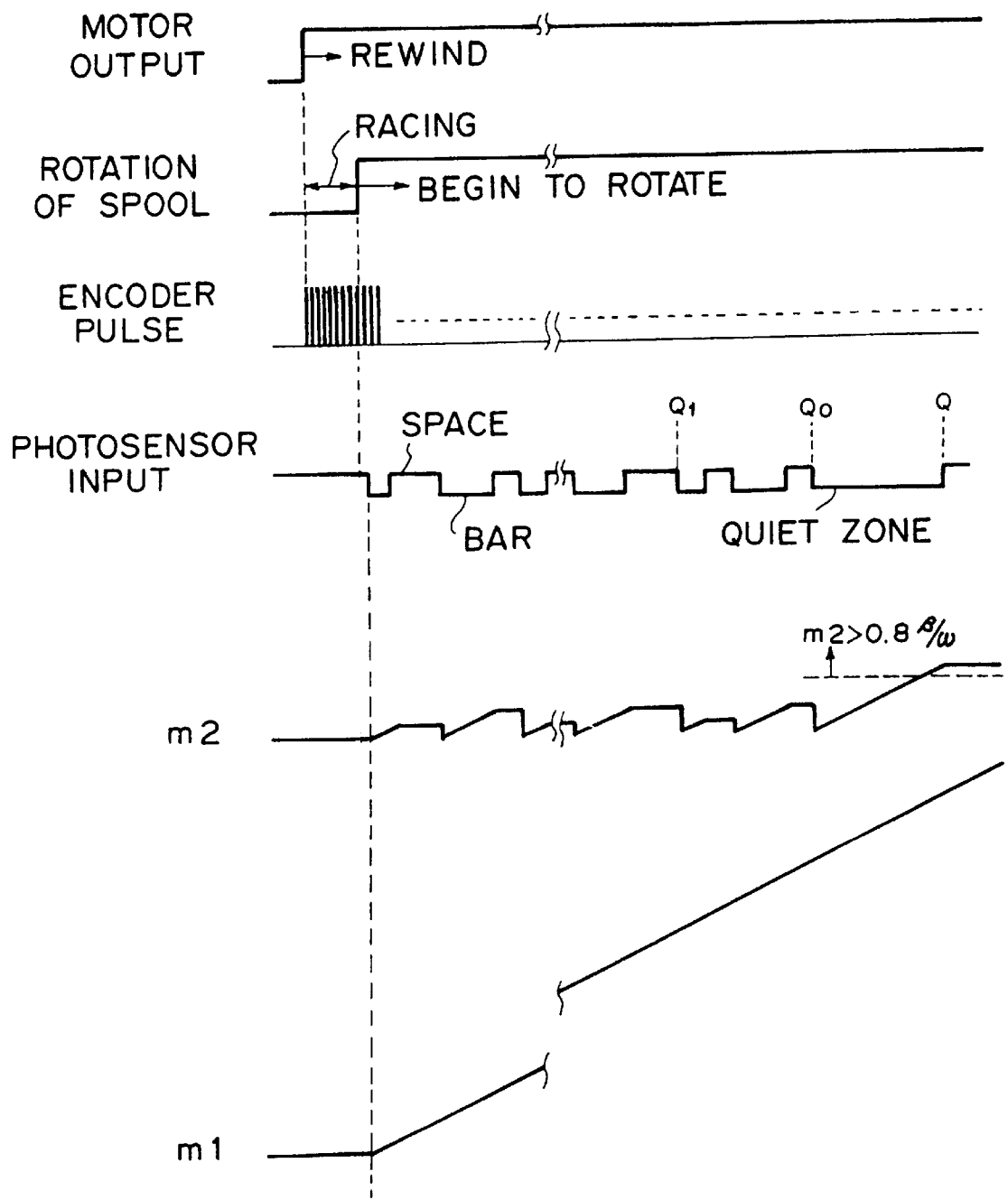
FIG. 16 shows the relation between the output of the motor, the rotation of the spool, the generation of the pulses from the rotary encoder, the input into the first photosensor, the count of the first counter m1 and the count of the second counter m2.

FIG. 16 shows the relation between the output of the motor 30, the rotation of the spool 12, the generation of the pulses from the rotary encoder 35, the input into the first photosensor 40, the count of the first counter m1 and the count of the second counter m2. Though the counts of the first and second counters m1 and m2 are digital values, they are expressed in an analogous fashion in FIG. 16 for the purpose of simplification.

When the black quiet zone 14a is detected, the central angle (m2×ω) of the black quiet zone 14a is subtracted from the total rotational angle (m1×ω) of the data disk 14, whereby the angle accm by which the data disk 14 was rotated before the first photosensor 40 detected the read end position $Q_0$ of the black quiet zone 14a is calculated (i.e., accm=ω×(m1−m2)). (step #26) Then the value of the angle accm obtained in step #26 is divided by 360° and the remainder is set as the effective value of the angle accm. (step #27)

Since the first photosensor 40 sees position Q3 which is angularly spaced from the read end position $Q_0$ by 3α when the film magazine 10 loaded is virgin as described above, the microcomputer 100 compares the effective value of the angle accm with 2.5α, and when the former is larger than the latter, the microcomputer 100 determines that the film magazine 10 loaded is virgin and sets the first frame of the film 13 to the position of exposure. (steps #28 and #31)

The first photosensor 40 sees position Q which is angularly spaced from the read end position $Q_0$ by 2α when the film magazine 10 loaded is partly exposed as described above. Accordingly when it is determined in step #28 that the former is not larger than the latter, the microcomputer 100 then compares the effective value of the angle accm with 1.5α. (step #29) When it is determined that the former is larger than the latter, the microcomputer 100 determines that the film magazine 10 loaded is partly exposed and sets the first frame of the unexposed part of the film 13 to the position of exposure. (step #32)

The first photosensor 40 sees position Q1 which is angularly spaced from the read end position $Q_0$ by α when the film magazine 10 loaded is fully exposed as described above. Accordingly when it is determined in step #29 that the former is not larger than the latter, the microcomputer 100 determines that the film magazine 10 loaded is fully exposed and stops the motor 30 so that the indicator 12a points the sign "fully exposed". (step #30)

Thereafter the LEDs 36 and 40a are turned off (step #33).

As can be understood from the description above, in the camera of this embodiment, the condition of use of the film in the film magazine 10 is distinguished utilizing a particular point of the bar codes such as the read begin position or the read end position, and accordingly, a plurality of conditions of use of the film can be distinguished without use of a particular means for indicating the condition of use of the film such as a cutaway portion. Further since the film need not be drawn out the magazine body when the condition of use is distinguished, the distinguishment can be effected in a short time.

Though, in the embodiment described above, the effective angle of rotation accm is compared with 2.5α and 1.5α, such values may be changed according to the accuracy requirement and may be set, for instance, to 2.8α and 1.8α.

In the embodiment described above, the spool drive shaft 34 races until the spool drive shaft 34 is engaged with the spool 12 and accordingly transition of the bar codes is detected to detect engagement of the spool drive shaft 34 with the spool 12. However, for instance, a switch for detecting engagement of the spool drive shaft 34 with the spool 12 may be provided instead of detecting transition of the bar codes.

Further the system may be arranged so that the spool drive shaft does not race. For example, the spool drive shaft may be pressed against the spool so that the spool is driven under the friction force therebetween, or the spool and the spool drive shaft may be arranged so that they can be engaged with each other at narrower intervals. In such a case, the counter m1 may be reset to start counting in response to starting the motor.

Further, in the embodiment described above, the rotational angle of the data disk 14 is detected by counting the encoder pulses and accordingly even if the rotational speed of the motor 30 fluctuates, the rotational angle of the data disk 14 can be detected with a high accuracy without affected by fluctuation of the motor speed.

The rotational angle of the data disk 14 may be detected on the basis of a clock built in the microcomputer 100.

Figure 9:
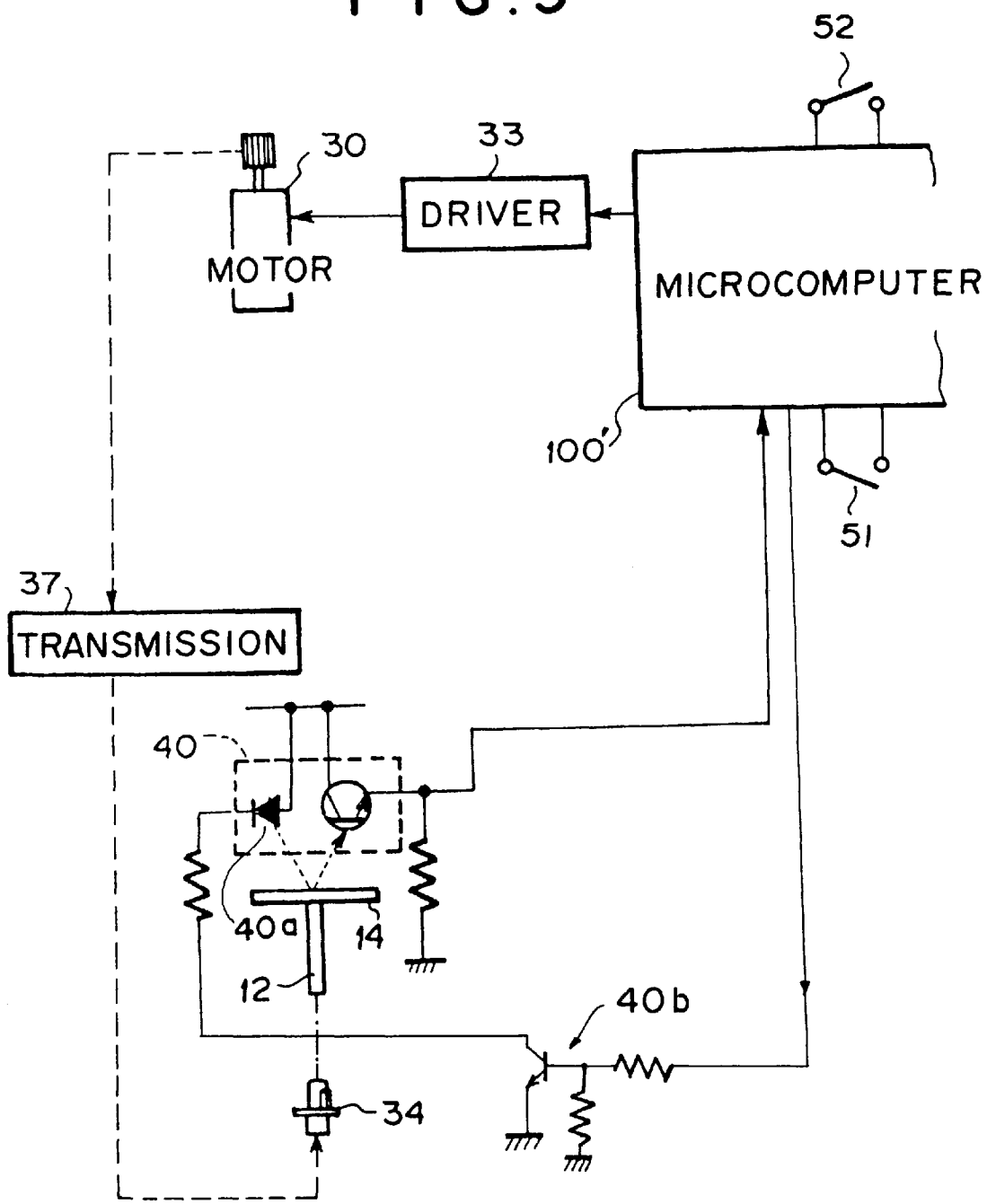
FIG. 9 is a block diagram of the electric circuit of the camera in accordance with a second embodiment of the present invention.
Figure 10:
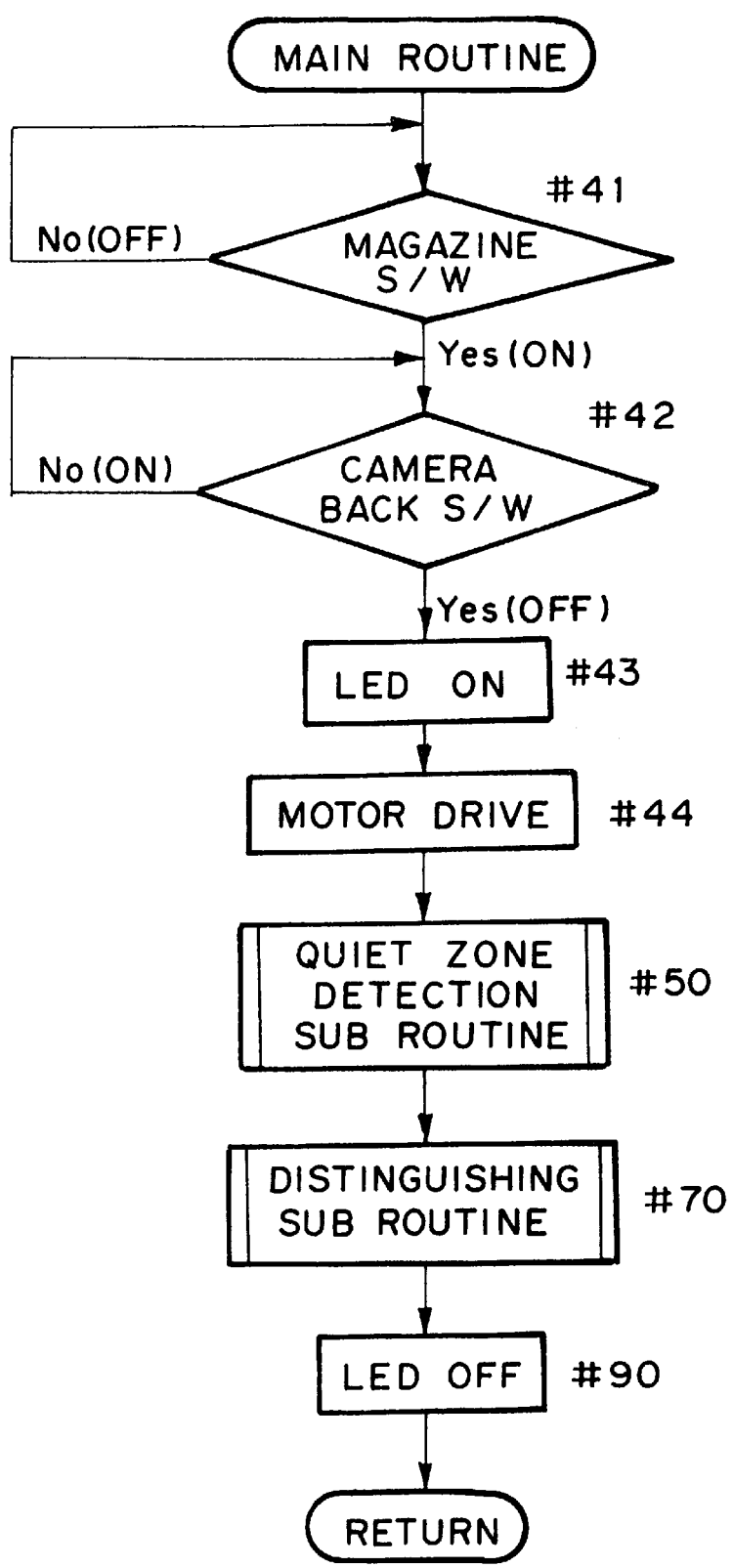
FIG. 10 shows a flow chart for illustrating the main routine for distinguishing the condition of use of the film in the camera of the second embodiment.

FIG. 9 shows an electric circuit of a camera in accordance with another embodiment of the present invention where the rotational angle of the data disk 14 is detected on the basis of a clock built in the microcomputer 100. The camera of this embodiment differs from the preceding embodiment in that it is not provided with the rotary encoder 35 and the second photosensor 36 and the program stored in the ROM is different from that employed in the preceding embodiment.

Figure 17:
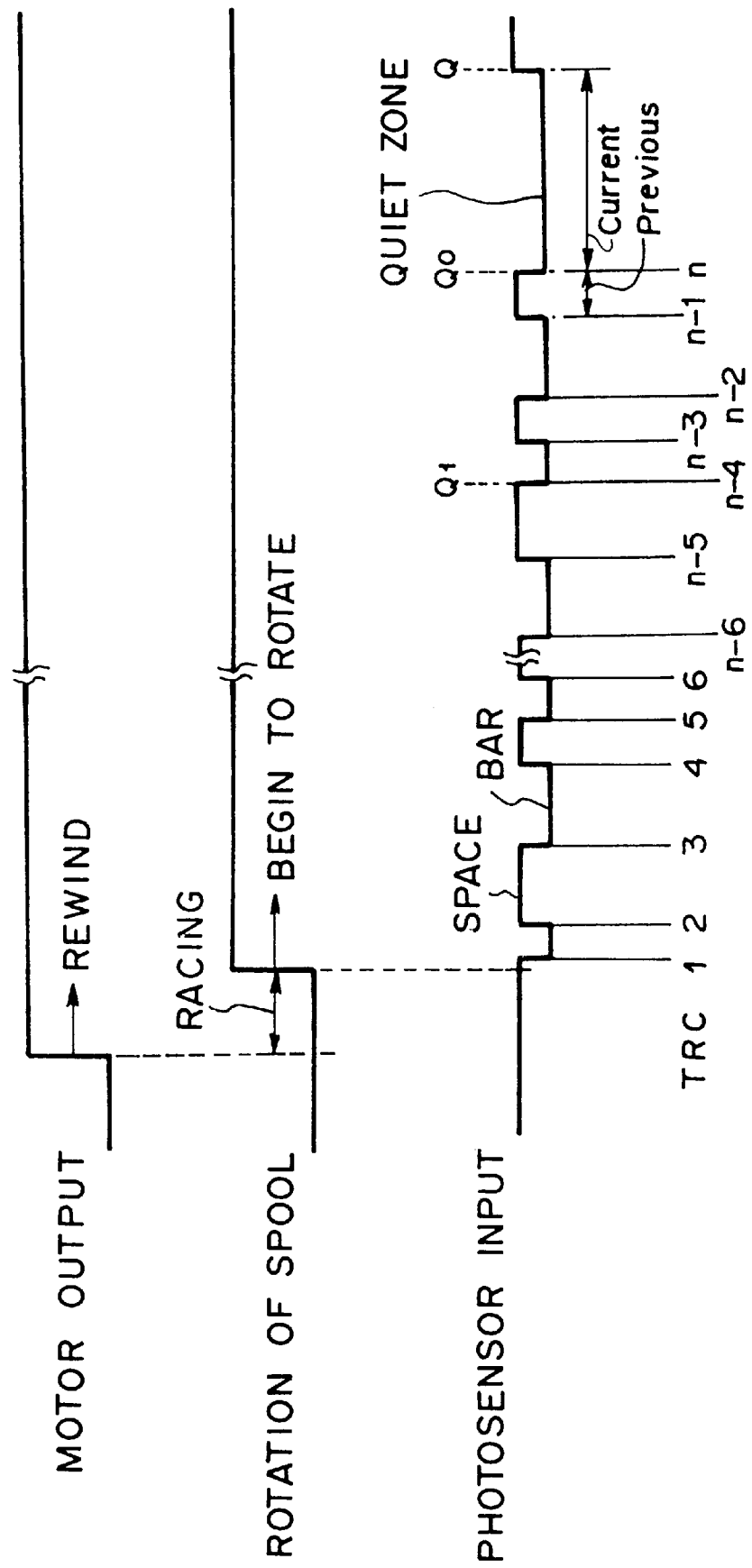
FIG. 17 shows the relation between the output of the motor, the rotation of the spool, the input into the photosensor, and the count of the TRC counter.

Operation of the camera of this embodiment will be described with reference to FIGS. 10 to 15 and 17, hereinbelow. FIGS. 10 to 15 show the flow charts of the program stored in the ROM of the microcomputer 100' employed in this embodiment. FIG. 17 shows the relation between the output of the motor 30, the rotation of the spool 12, the input into the photosensor for detecting the bar codes and the count of a TRC counter to be described later.

When a film magazine 10 is loaded in the camera, the magazine switch 51 is turned on (step #41), and when the camera back 73 is closed, the camera back switch 52 is turned off (step #42). When the camera back switch 52 is turned off, a switch 40b is turned on and a LED 40a for the photosensor 40 is energized. (step #43) Then the motor 30 is driven in the film rewinding direction and the spool drive shaft 34 is driven by way of the driving force transmission mechanism 37. (step #44) When the key 34a on the spool drive shaft 34 is not in alignment with the keyway 12b in the spool 12, the spool drive shaft 34 cannot engage with the spool 12 and accordingly the spool 12 is not rotated (the spool drive shaft 34 races). See the time chart shown in FIG. 17.

Figure 11:
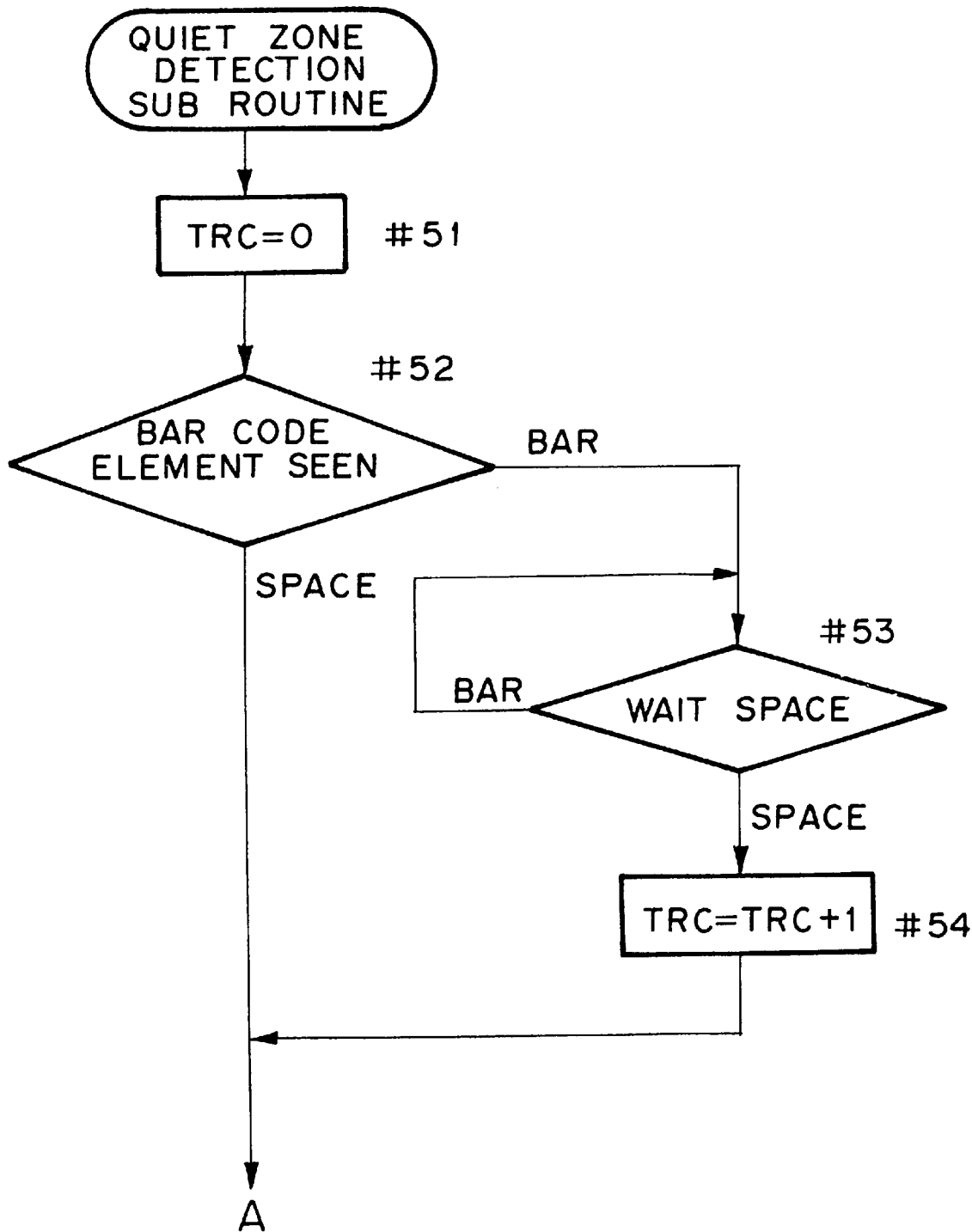
FIGS. 11 to 13 show the quiet zone detection sub routine.
Figure 12:
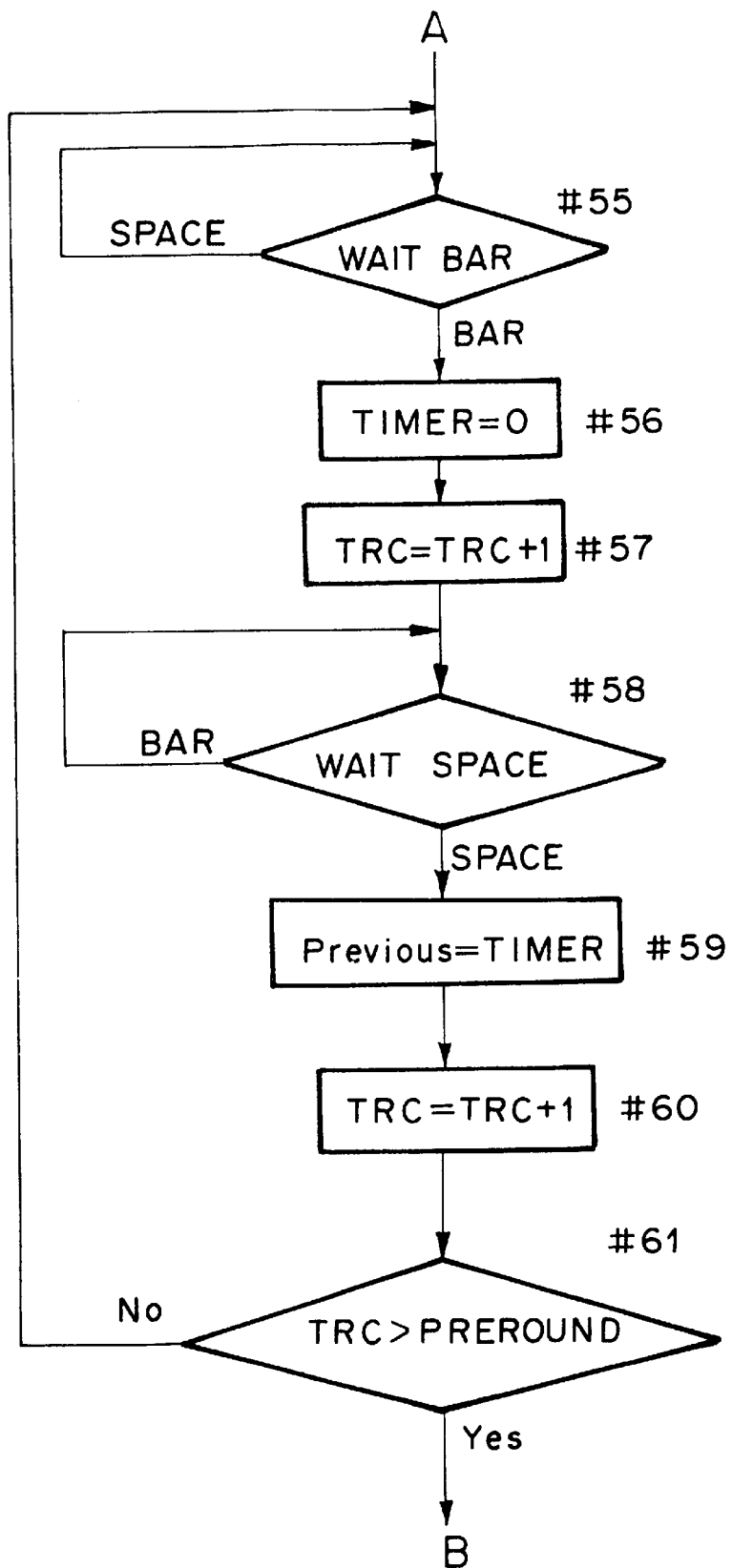
Figure 13:
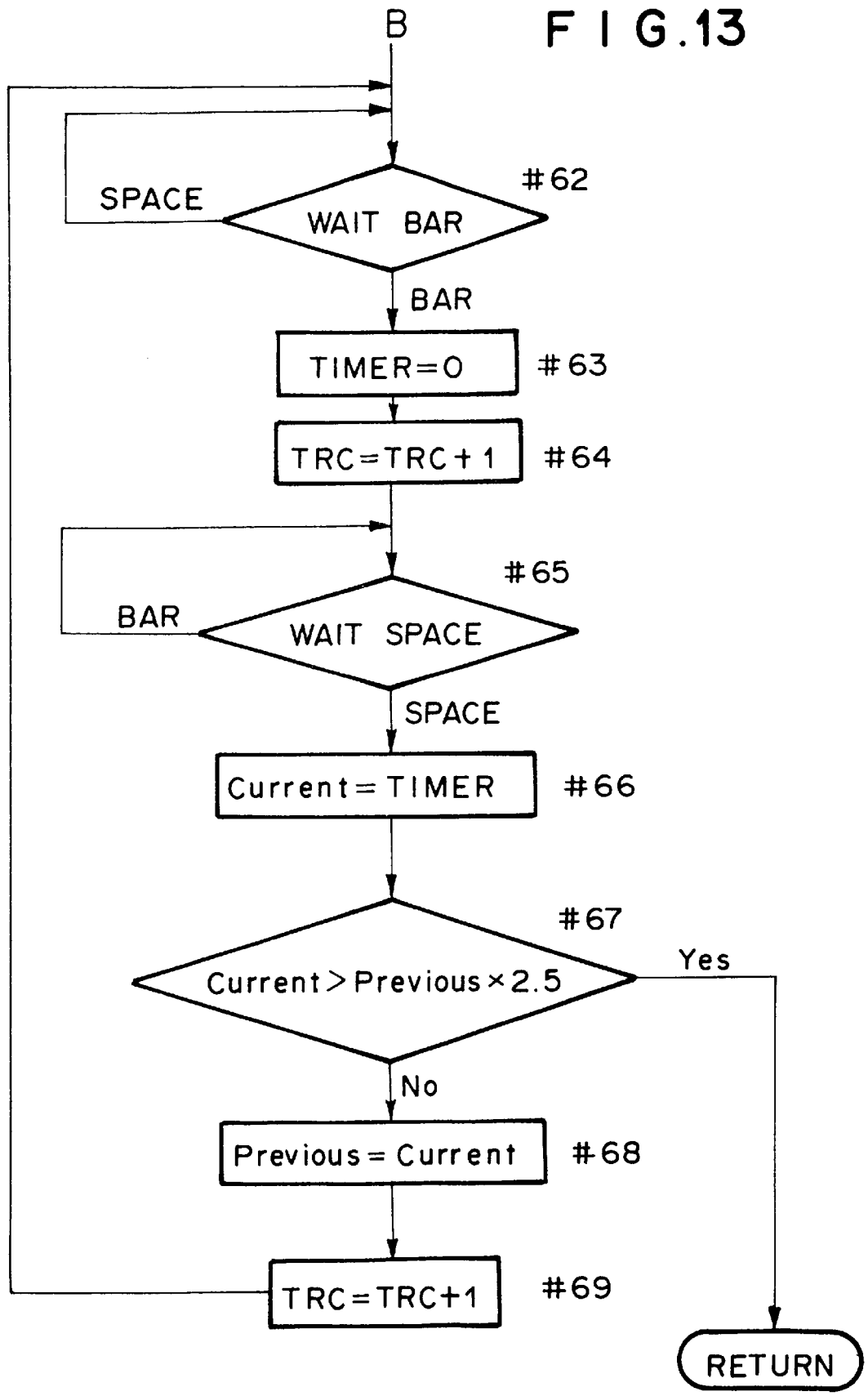

When the motor 30 is started, the microcomputer 100' jumps to the quiet zone detection sub routine shown in FIGS. 11 to 13. (step #50) In the quiet zone detection sub routine, the number of bar code elements passing the photosensor 40 before the photosensor 40 detects the black quiet zone 14a after the motor 30 is started is counted and the time required for each bar to pass the photosensor 40 is measured.

First the microcomputer 100' resets a TRC counter, which counts the number of transitions (change in the amount of light detected by the photosensor 40 at the boundary of the adjacent bar code elements), to 0 (step #51) and then determines which the photosensor 40 sees a bar or a space of the bar codes before the data disk 14 (or the spool 12) begins to rotate on the basis of the output of the photosensor 40 which detects reflected light from the data disk 14. (step #52) When it is determined that the photosensor 40 sees a bar, the microcomputer 100' waits until the photosensor 40 detects a space (step #53) and then increments the TRC counter when the photosensor 40 detects a space(step #54). Then the microcomputer 100' waits until the next bar is detected by the photosensor 40. (step #55) On the other hand, when it is determined in step #52 that the photosensor 40 sees a space, the microcomputer 100' waits until the photosensor 40 detects a bar (step #55).

That the microcomputer 100' waits until the bar is detected (in step #55) and until the space is detected (in step #53) means that the microcomputer 100' waits until the key 34a is brought into engagement with the keyway 12b and the spool 12 and the data disk 14 begin to rotate.

When a bar is detected, the time required for the bar to pass the photosensor 40 is measured. That is, a timer which is incremented on the basis of time signals generated by the clock built in the microcomputer 100' is reset (step #56), the TRC counter is incremented (step #57), the value of the timer at the time a space is detected (step #58) is input into a variable "previous" (step #59) and then the TRC counter is incremented (step #60). The value stored in the variable "previous" represents the time which the last bar took to pass the photosensor 40.

Then the microcomputer 100' waits for the count of the TRC counter to exceed a predetermined value "preround" which has been stored in the RAM. This is for waiting the rotation of the motor to be stabilized since the rotational speed of the motor 30 is unstable just after starting. That is, by waiting for the count of the TRC counter to exceed the predetermined value "preround", processing can be prevented from being effected on the basis of the variable "previous" detected in the period when the motor 30 is unstable, and at the same time it is prevented to take data when the spool 12 is slightly rotated while the spool drive shaft 34 is racing.

When the count of the TRC counter exceeds the predetermined value "preround", the time which the last bar took to pass the photosensor 40 is detected and input into a variable "current" in steps #62 to #66 in the manner similar to steps #55 to #59. The value of the variable "current" is compared with 2.5 times the value of the variable "previous" in step #67. When the former is not larger than the latter, the value of the variable "current" is input into the variable "previous" to update the variable "previous". (step #68) Then the TRC counter is incremented. (step #69) Steps #62 to #69 are repeated until the value of the variable "current" comes to be larger than 2.5 times the value of the variable "previous", i.e., the black quiet zone 14a is detected. When the value of the variable "current" comes to be larger than 2.5 times the value of the variable "previous", the microcomputer 100' determines that the black quiet zone 14a has just passed the photosensor 40 and returns to the main routine.

Figure 14:
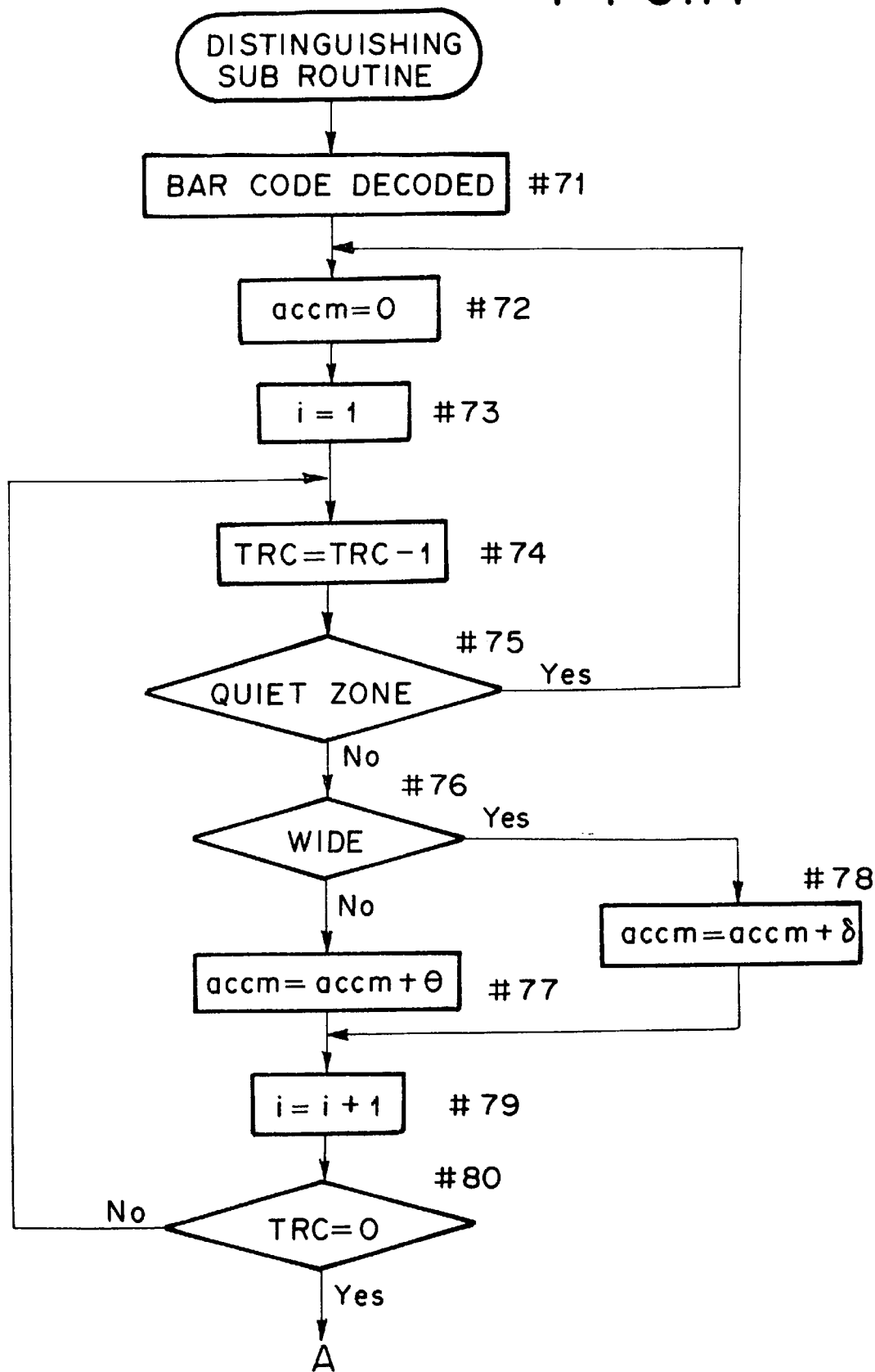
FIGS. 14 and 15 show the distinguishing sub routine.
Figure 15:
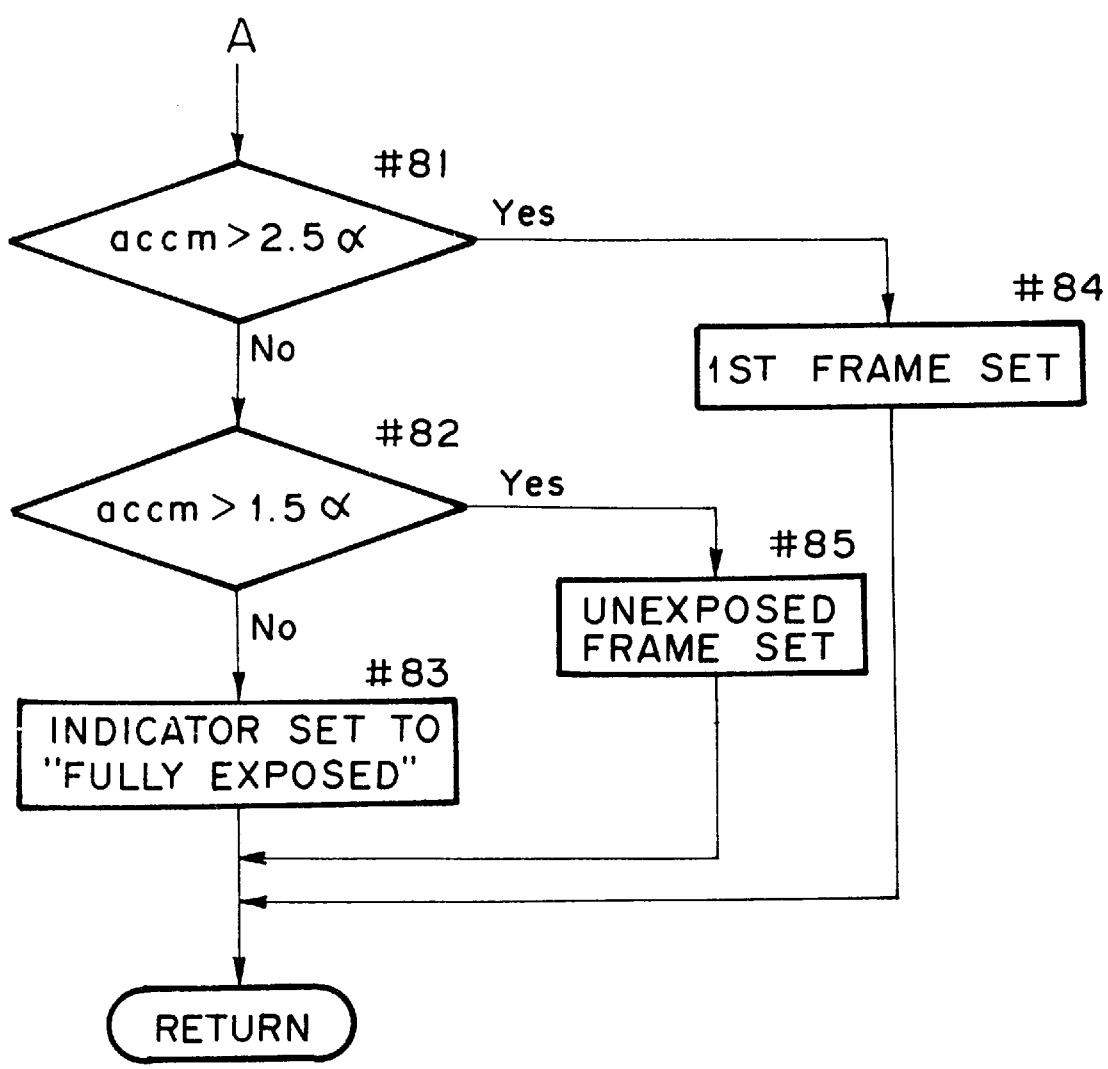

When the black quiet zone 14a is detected the microcomputer 100' jumps to the distinguishment sub routine shown in FIGS. 14 and 15. (step #70) In the distinguishment sub routine, the rotational angle of the data disk 14 is calculated on the basis of the count of the TRC counter which represents the number of the bar code elements counted from the time the data disk 14 begins to be rotated to the time the black quiet zone 14a is detected, and the condition of use of the film is determined on the basis of the rotational angle of the data disk 14 calculated.

First the data represented by the bar codes on the data disk 14 are decoded by a bar code decoder formed by the photosensor 40 and the microcomputer 100'. (step #71) By this decoding, the width of i-th bar code element as numbered from the black quiet zone 14a in the counterclockwise direction is determined ($1 \leq i \leq N$, N being the number of the bar code elements including the black quiet zone 14a), and the pattern of the widths of the elements is set as shown in the following table 1.

TABLE 1

| element 1 = narrow |
| element 2 = wide |
| element 3 = narrow |
| element 4 = narrow |
| element 5 = wide |
| element 6 = wide |
| ... |
| ... |
| ... |
| element N = quiet zone |

Then the variable accm representing the rotational angle is reset in step #72 and the number i of the element is reset in step #73. Then the TRC counter is decremented one by one and $\theta$ is added to the variable accm when the element corresponding to the count of the TRC counter is narrow while $\delta$ is added to the variable accm when the element corresponding to the count of the TRC counter is wide. These steps are repeated until the TRC counter is decremented to 0. (steps #74 to #80) The value of the variable accm when the count of the TRC counter becomes 0 represents the rotational angle of the data disk 14 from the time the photosensor 40 detects the first transition to the time the photosensor 40 detects the read end position $Q_0$ of the black quiet zone 14a.

When the value of the predetermined value "preround" in step #61 is set large, the rotational angle accm of the data disk 14 becomes larger than 360° and the count of the TRC counter sometimes exceed N. In such a case, i becomes N before the count of the TRC counter becomes 0 and the element i at that time is the black quiet zone 14a. Accordingly when the TRC counter is further decremented, the angle of the bar code element adjacent to the black quiet zone 14a on the counterclockwise side thereof is added to the variable accm double. Further the value of the variable accm includes an additional rotational angle corresponding to one rotation of the data disk 14. Accordingly, the number i of the element is reset to 1 and the variable accm is reset to 0 at the time the element i becomes the black quiet zone 14a, and then the addition routine is repeated.

The following steps #81 to #90 are for determining the condition of use of the film and setting feed of the film and are the same as the steps #28 to #33 in the preceding embodiment. Accordingly the steps will not be described here.

The data disk 14 can be rotated by angle $\delta$ at the maximum before the photosensor 40 detects the first transition and the rotational angle of the data disk 14 is not detected before the first transition is detected. Accordingly, when a plurality of positions of the spool representing different conditions of use of the film are in the range, the different conditions cannot be distinguished. That is, the positions of the spool representing different conditions of use of the film should be angularly spaced from each other by at least $\delta$ ($\alpha \geq \delta$), and more strictly, the photosensor 40 should not see the same bar code element for the positions of the spool representing different conditions of use of the film.

As can be understood from the description above, also in the camera of this embodiment, the condition of use of the film in the film magazine 10 is distinguished utilizing a particular point of the bar codes such as the read begin position or the read end position, and accordingly, a plurality of conditions of use of the film can be distinguished without use of a particular means for indicating the condition of use of the film such as a cutaway portion. Further since the film need not be drawn out the magazine body when the condition of use is distinguished, the distinguishment can be effected in a short time.

Though, in the embodiment described above, the effective angle of rotation accm is compared with 2.5α and 1.5α, such values may be changed according to the accuracy requirement. Further the system may be arranged so that the spool drive shaft does not race.

Figure 18:
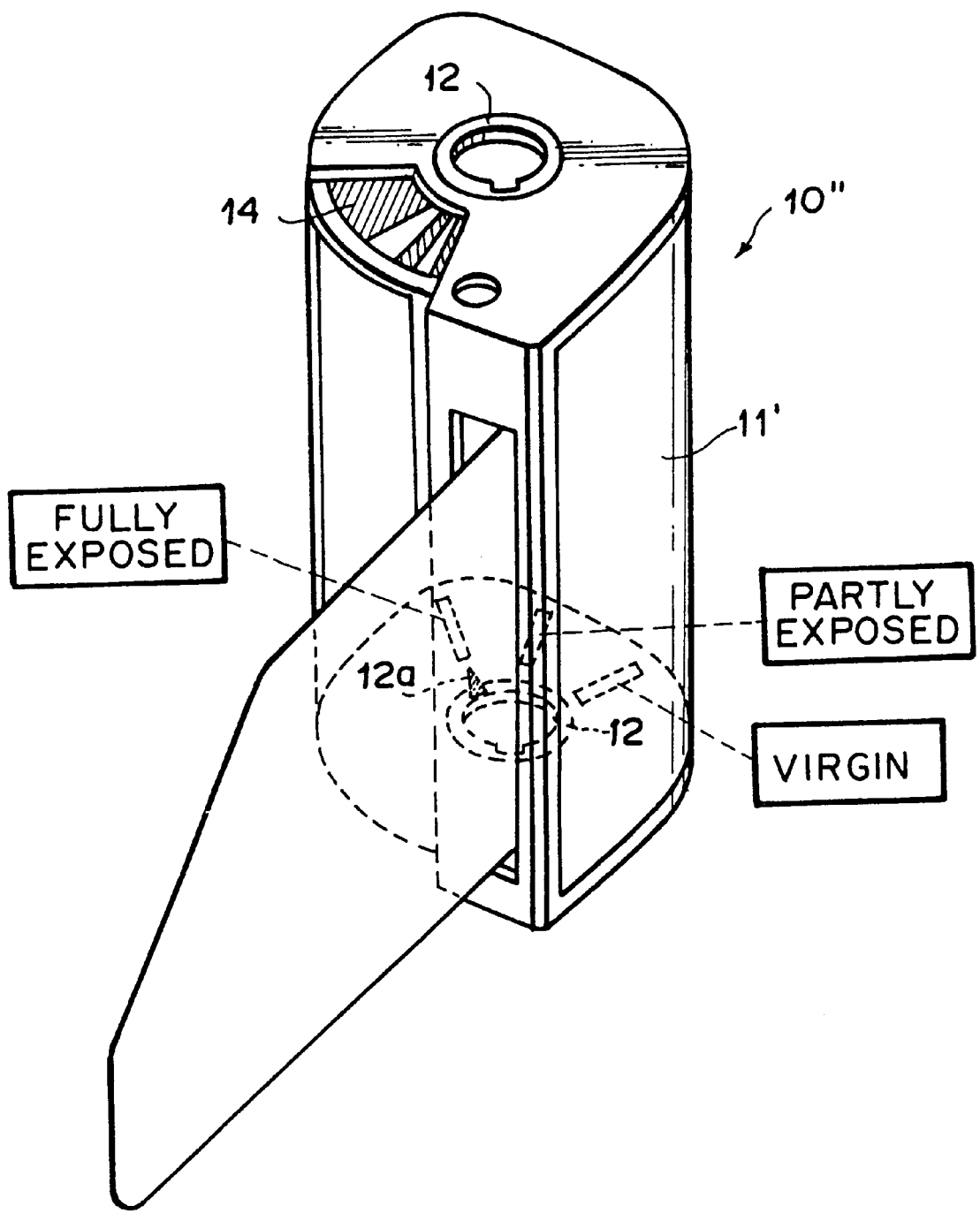
FIG. 18 is a perspective view showing another example of the film magazine.

Further though in the embodiments described above, the present invention is applied to a film magazine where the data disk 14 and the indicator 12a are disposed on the same end of the magazine body, the present invention may be applied to a film magazine of other types. For instance, the present invention may be applied to a film magazine 10' where the data disk 14 is disposed on one end of the magazine body and the indicator 12a is disposed on the other end of the same as shown in FIG. 18. In this case, the photosensor 40 for reading the bar codes is disposed to be opposed to the data disk 14 when the film magazine 10' is loaded in the camera.

The device of the present invention may be used by itself as a means for distinguishing the condition of use of the film, for instance, in a color laboratory, or may be used as a part of other systems without being limited to a camera.

A camera in accordance with a third embodiment of the present invention will be described with reference to FIGS. 19 to 22, hereinbelow.

Figure 19:
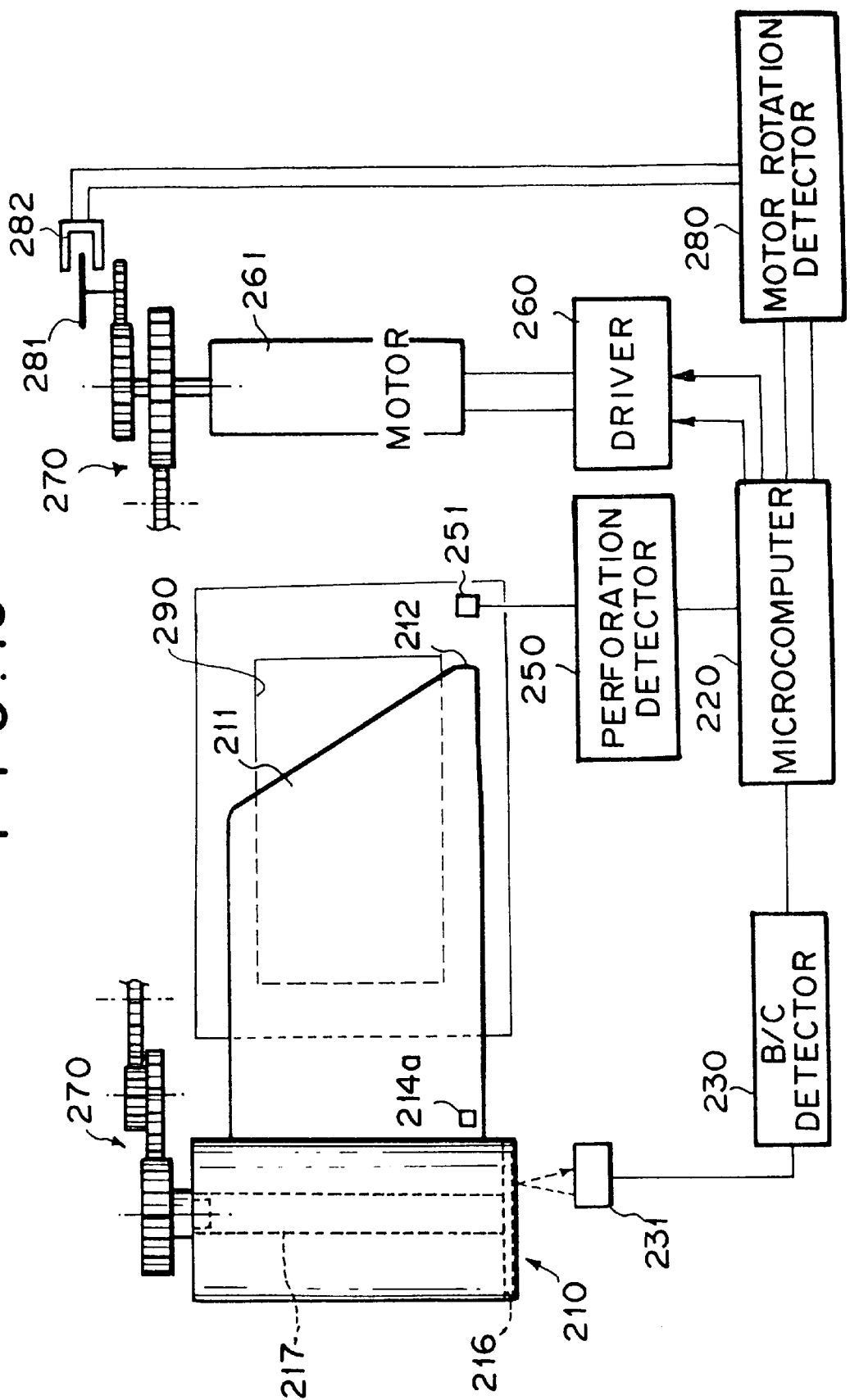
FIG. 19 is a schematic view showing an important part of a photographic camera in accordance with a third embodiment of the present invention.
Figure 22:
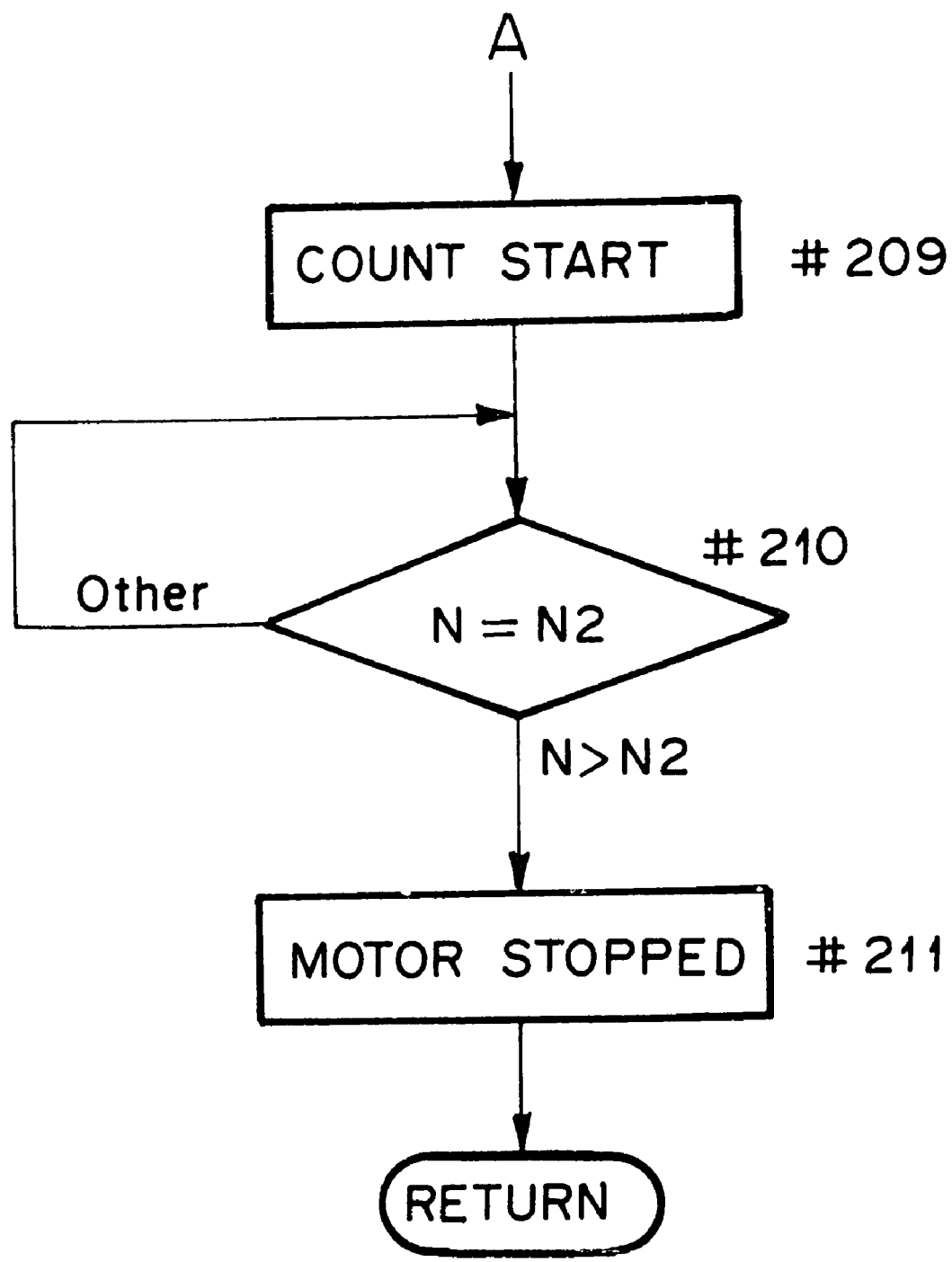

In FIGS. 19 and 22, a film magazine 210 comprises a spool 217 which is supported for rotation in a magazine body and a roll film 211 wound around the spool 217. A data disk 216 is mounted on one end of the spool 217 to be rotated together with the spool 217. The data disk 216 carries thereon bar codes representing information inherent to the film magazine 210 such as the ISO sensitivity, the number of exposure frames and the like of the film 211.

A pair of (first and second) perforations 214a and 214b are formed in the lower edge of the film 211 on the right side of each frame. An additional perforation (not shown) is formed in the lower edge of the film 211 on the left side of the last frame (e.g., thirty-sixth frame in the case of a 36 exposure film) in addition to the perforations 214a and 214b on the right side thereof.

The camera of this embodiment comprises a driving force transmission system 270 which rotates the spool 217 of the film magazine 210, an electric drive motor 261 which drives the driving force transmission system 270, a photosensor 251 which detects the perforations 214a and 214b and said additional perforation on the left side of the last frame (will be referred to as "the last frame perforation", hereinbelow) in sequence as the spool 217 is rotated and the film 211 is fed, a bar code detector 231 which reads the bar codes on the data disk 216 as the data disk 216 is rotated, a rotary encoder 281 and a photodetector 282 which are provided with respect to a part of the driving force transmission system 270 to detect the rotational angle of the motor 261, and a microcomputer 220 which controls film feeding and other various functions of the camera on the basis of the information detected by the sensors described above.

The microcomputer 220 is provided therein a RAM in which variables necessary for the control are stored, and a ROM in which programs and constants necessary for the control are written. The rotational angle of the motor 260 is substantially proportional to the film feed length so long as the diameter of the film roll wound around the spool 217 does not change by a large value.

The photosensor 251 receives reflection and outputs a high level perforation signal when the photosensor 251 is opposed to the film surface and outputs a low level perforation signal when it is opposed to the perforations 14a or 14b or the last frame perforation or when there is no film in front of the photosensor 251. See FIG. 2.

The motor 261, the photosensor 251, the bar code detector 231 and the photodetector 282 are connected to the microcomputer 220 respectively by way of a motor driver 260, a perforation detecting circuit 250, a bar code detecting circuit 230 and a motor rotation detecting circuit 280.

A routine for stopping the motor 261 (FIGS. 21 and 22) is set in one of the programs written in the ROM built in the microcomputer 220. In the routine, the motor 261 is stopped when a predetermined number of pulses are output from the rotary encoder 281 after the leading end 212 of the film 211 is detected by the photosensor 251. That is, the length L (FIG. 20) by which the film 211 is to be rewound in order to completely rewind the film 211 into the magazine body at the time the leading end 212 of the film 211 is detected by the photosensor 251 can be known in advance. Accordingly, by stopping the motor 261 when the number of the pulses output from the rotary encoder 281 reaches a number corresponding to the rotational angle of the motor 261 which corresponds to the length L after the leading end 212 of the film 211 is detected by the photosensor 251, the film 211 can be completely rewound into the magazine body.

The operation of the camera of this embodiment will be described, hereinbelow.

The film 211 is fed out of the magazine body in the following manner.

When the motor 261 is driven in a film feeding direction, the film 211 is fed out of the magazine body and the leading end 212 of the film 211 reaches the photosensor 251, the perforation signal which has been low turns high. When the film 211 is further fed forward and the first perforation 214a for the first frame comes to the photosensor 251, the perforation signal once turns low and then turns high when the first perforation 214a passes the photosensor 251. When the perforation signal is turned low by the first perforation 214a, the motor speed is reduced and the film feed speed is reduced by a film feed routine stored in the ROM. When the film 211 is further fed forward and the second perforation 214b for the first frame comes to the photosensor 251, the perforation signal is turned low and the motor 261 is stopped, whereby the first frame 211a of the film 211 is stopped behind a film aperture 290 of the camera. Thus the camera is ready for photographing. In this state, the second perforation 14b is in front of the photosensor 251 and the perforation signal is low.

When the frames are exposed one by one and the last frame is exposed, the motor 261 is rotated in the film feed direction until the last frame perforation comes to the photosensor 251, and when the last frame perforation is detected by the photosensor 251, film rewinding operation is automatically started. When a manual rewind switch (not shown) is operated with some of the frames left unexposed, the film rewinding operation is started from the condition where the second perforation 214b for the frame positioned behind the film aperture 290 at that time is positioned in front of the photosensor 251.

Figure 21:
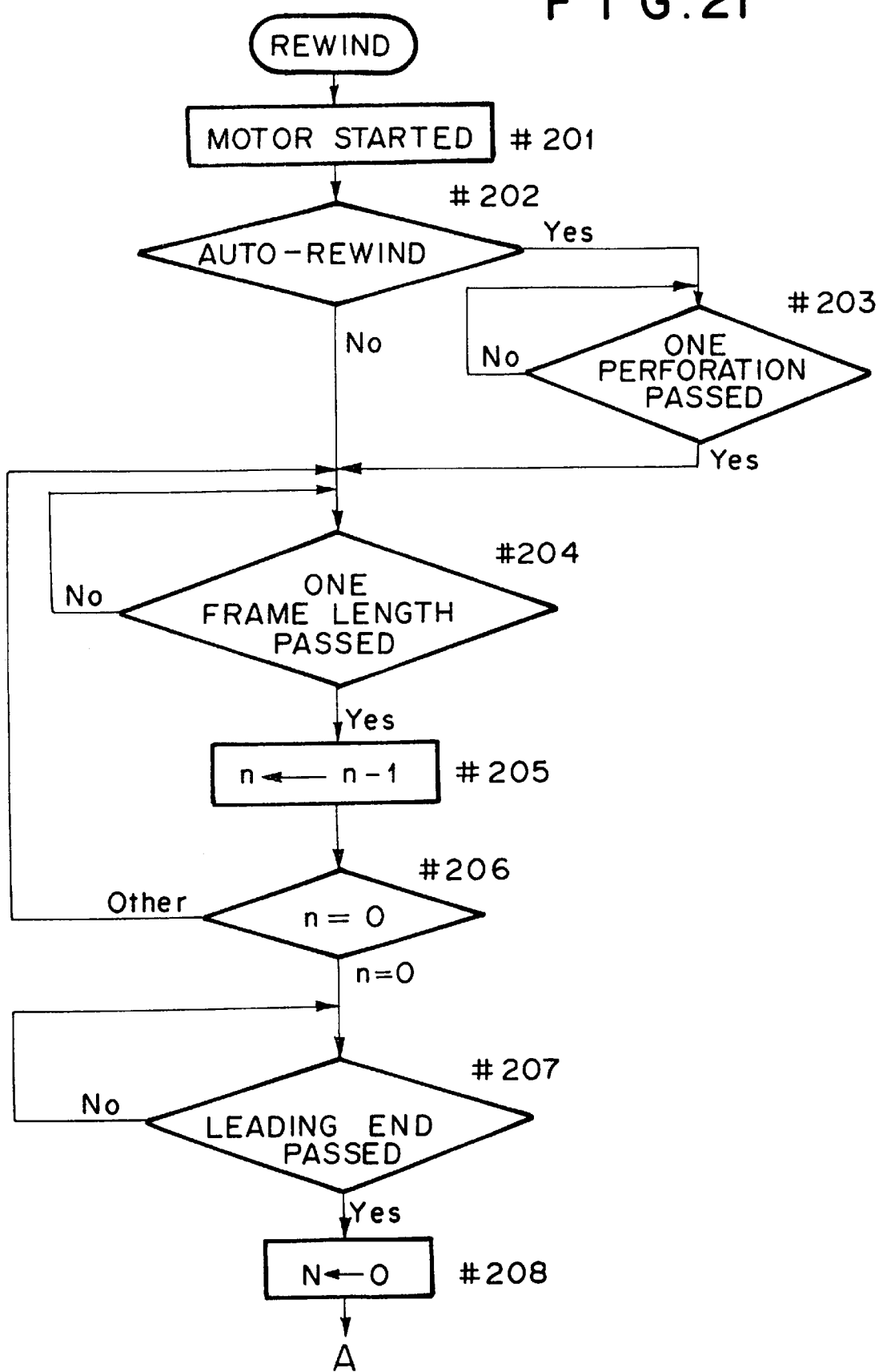
FIGS. 21 and 22 show a flow chart for illustrating the routine for controlling film rewinding in the camera of the third embodiment.

The routine for stopping the motor 261 will be described with reference to the flow chart shown in FIGS. 21 and 22, hereinbelow. When the film rewinding operation is started, the motor 261 is started according to the procedure stored in the ROM. (step #201) Then it is determined whether the rewinding is the automatic rewinding or the manual rewinding on the basis of whether the manual rewind switch has been operated. (step #202) When it is determined that the rewinding is the automatic rewinding, the microcomputer 220 waits until the photosensor 251 detects the last frame perforation (step #203). Thereafter or when it is determined step #202 that the rewinding is the manual rewinding, the microcomputer 220 waits for the film 211 to be rewound by a length of one frame. (step #204) That the film 211 is rewound by the one frame length can be detected by detecting that a pair of perforations have passed the photosensor 251. That is, when the perforation detecting circuit 250 detects a pair of low level perforation signals, it is determined that the film 211 has been rewound by the one frame length.

When the film 211 is rewound by the one frame length, the count of the frame counter n (stored in the RAM as the number of the frames which have been fed before the rewinding is started) is decremented by one. (step #205) Steps #204 and #205 are repeated until the count of the frame counter n becomes 0. (step #206)

When the count of the frame counter n becomes 0, the microcomputer 220 waits for the leading end 212 of the film 211 to pass the photosensor 251. (step #207) That is, when the perforation signal which has been high turns low, it is determined that the leading end 212 of the film 211 has passed the photosensor 251.

When the leading end 212 of the film 211 passes the photosensor 251, the count of the pulse counter N, which counts the number of the pulses output from the rotary encoder 281 and represents the rotational angle of the motor 261, is reset to 0. (step #208)

Then the pulse counter N is incremented one by one each time the photodetector 282 detects a pulse. (step #209) The number N2 of the pulses to be output from the rotary encoder 281 when the film 211 is rewound by the length L (FIG. 20) has been empirically determined and stored in the ROM. Thus when the count of the pulse counter N reaches the number N2 (step #210), it is determined that the film 211 has been completely rewound into the magazine body and the motor 261 is stopped. (step #211)

In the manner described above, the film 211 can be surely rewound into the magazine body even if the film rewinding speed fluctuates due to, for instance, reduction in supply power to the motor 261 and at the same time the film rewinding time is shortened since the motor 261 is not driven in vain after the film 211 is completely rewound into the magazine body.

Figure 23:
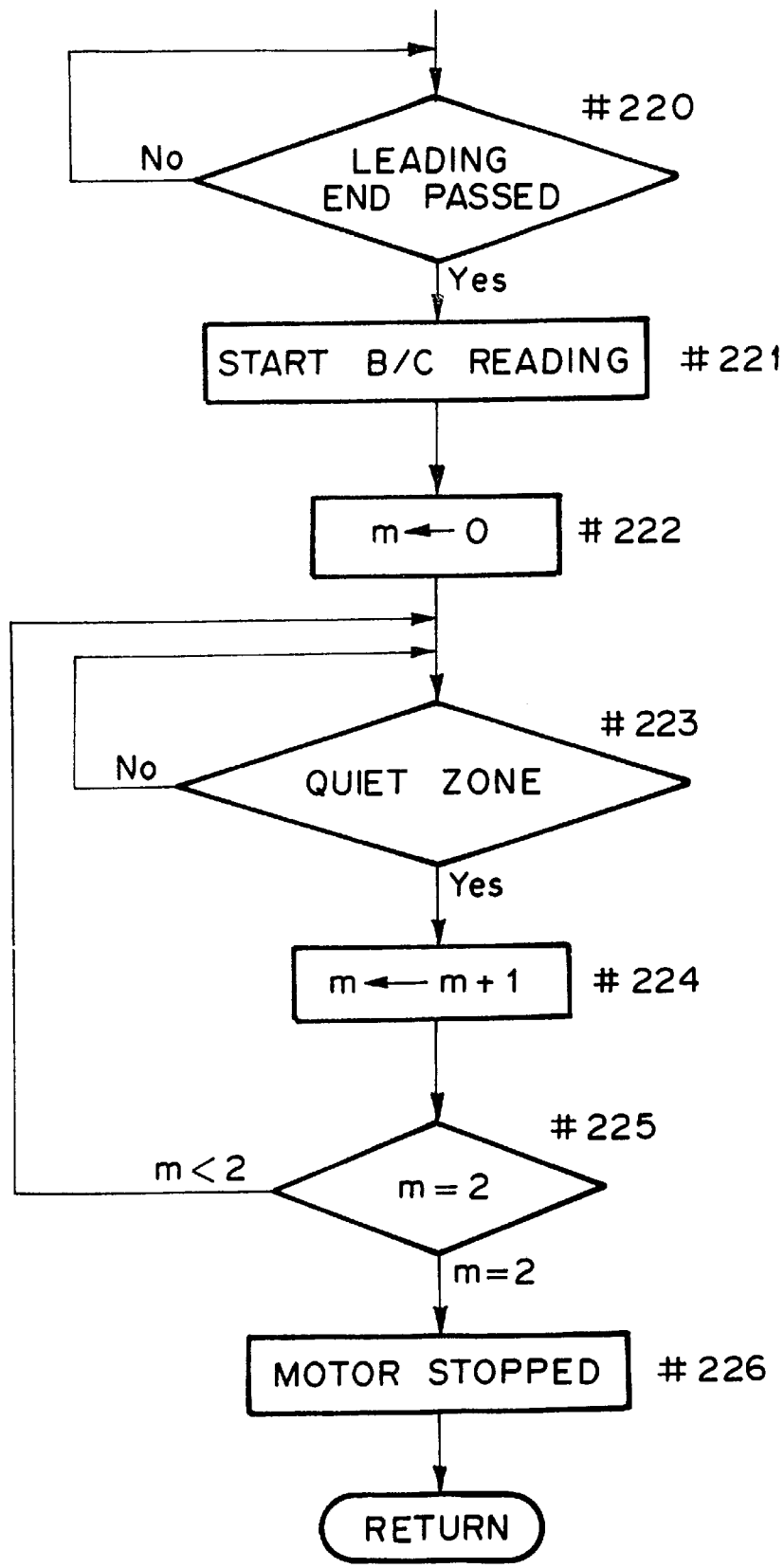
FIG. 23 shows a flow chart for illustrating modification of the routine for controlling film rewinding in the camera of the third embodiment.

Though, in the embodiment described above, the length by which the film 211 is actually rewound is detected by counting the number of the pulses output from the encoder 281, the length may be detected in other various ways. For example, the length can be detected by detecting the rotational angle of the data disk which is rotated together with the spool. FIG. 23 shows a flow chart for controlling the motor 261 on the basis of the rotational angle of the data disk 216. In FIG. 23, after the same steps as steps ##201 to #206, the microcomputer 220 waits for the leading end 212 of the film 211 to pass the photosensor 251. (step #220) From the time the leading end 212 of the film 211 passes the photosensor 251, the microcomputer 220 causes the bar code detecting circuit 230 to start reading the bar codes on the data disk 216. (step #221)

The bar codes comprise a plurality of bars of a low reflectivity and a plurality of a spaces of a high reflectivity which are alternately arranged in the circumferential direction of the data disk 216. One of the bars (black quiet zone) is greatly wider than the other bars and defines a read begin point.

The bar code detector 231 projects a light beam onto the bar codes and receives reflection from the bar codes. The bar code detecting circuit 230 determines which of the bar and the space the bar code detector 231 sees on the basis of the intensity of the reflection. When the space is detected, the bar code detecting circuit 230 outputs a high level signal and when the bar is detected, the bar code detecting circuit 230 outputs a low level signal. (See FIG. 20)

In the camera of this modification, it is assumed that the data disk 216 makes one rotation while the film 211 is rewound by the length L, and the motor 261 is stopped when the black quiet zone is detected twice after the leading end 212 of the film 211 is detected by the photosensor 251. Since the black quiet zone can be detected before the data disk 216 makes a complete one rotation and in such case the film leader cannot be completely rewound into the magazine body if the motor 261 is stopped when the black quiet zone is detected for the first time. Accordingly, in this modification, the motor 261 is stopped when the black quiet zone is detected twice.

That is, after the bar code detecting circuit 230 starts detecting the bar codes, a counter m which counts the number of times the black quiet zone is detected is reset to 0. (step #222) Then the counter m is incremented by one each time the black quiet zone is detected until the count of the counter m becomes 2. (steps #223 to #225) When the count of the counter m becomes 2, the motor 261 is stopped. (step #226)

In the manner described above, the film 211 can be surely rewound into the magazine body even if the film rewinding speed fluctuates due to, for instance, reduction in supply power to the motor 261 and at the same time the film rewinding time is shortened since the time the motor 261 is driven in vain after the film 211 is completely rewound into the magazine body is minimized.

Figure 20:
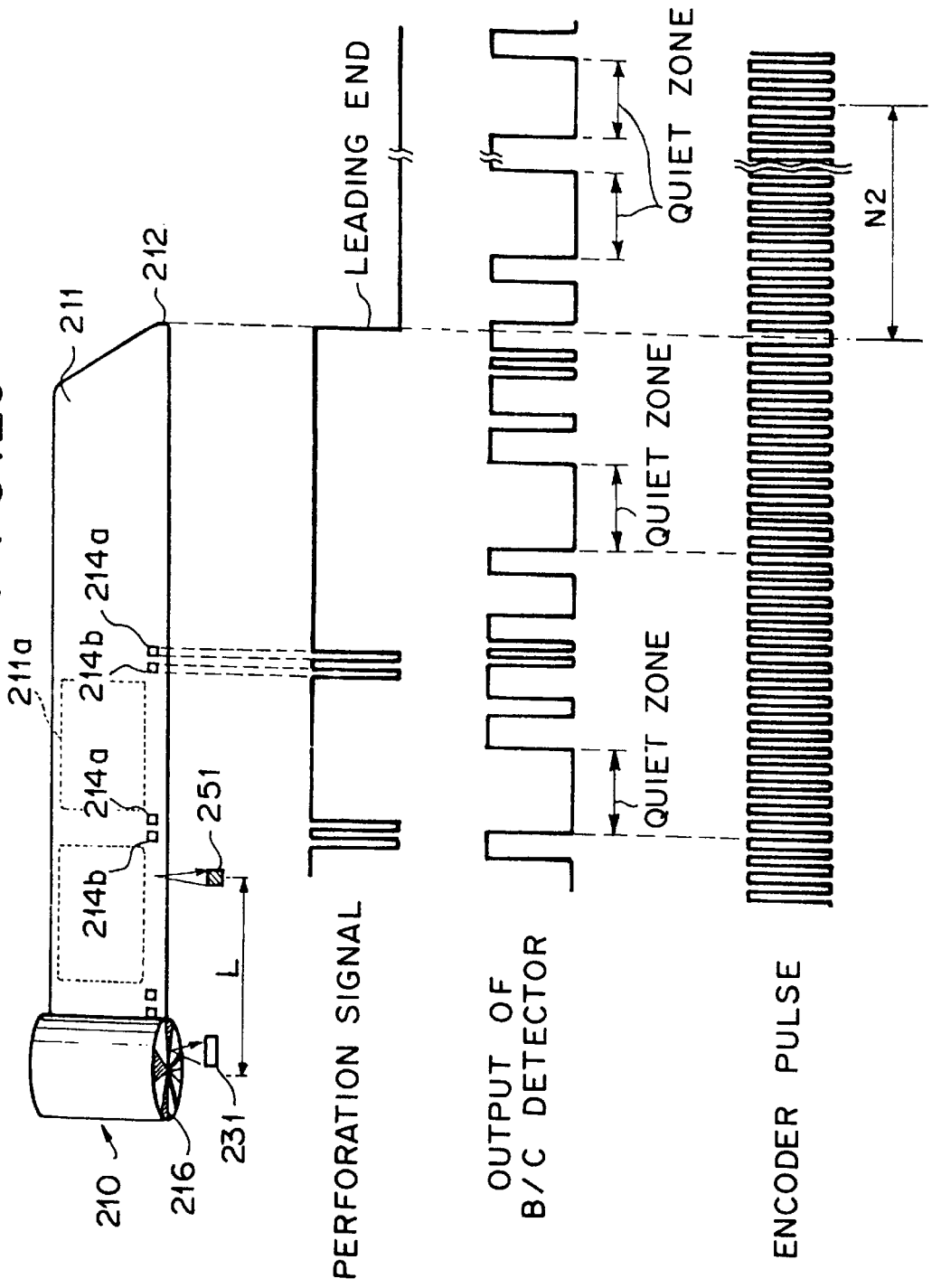
FIG. 20 is a view showing film rewinding and the outputs of the signals detected.
Figure 24:
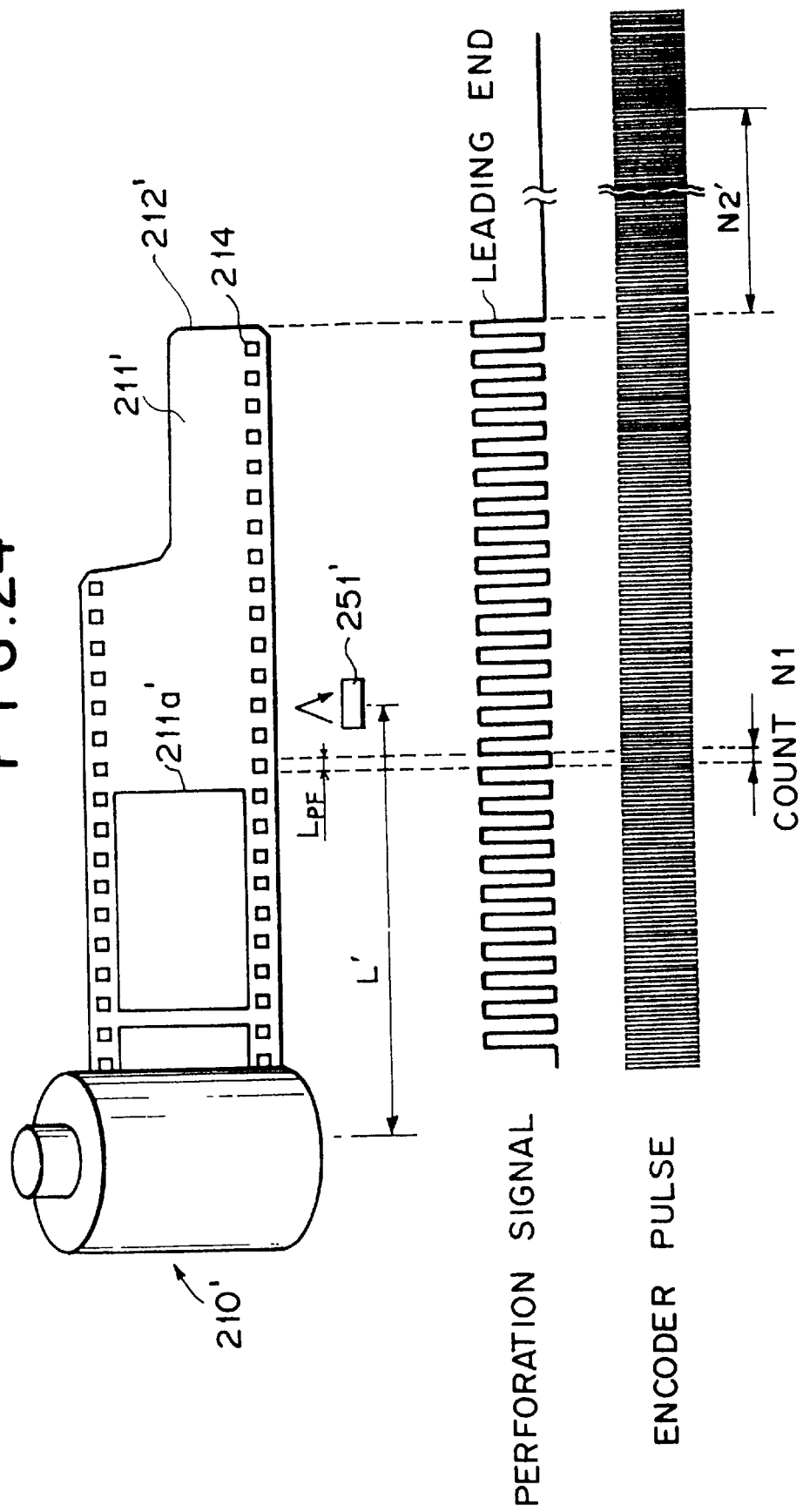
FIG. 24 is a view showing film rewinding and the outputs of the signals detected in a modification of the camera of the third embodiment.
Figure 25:
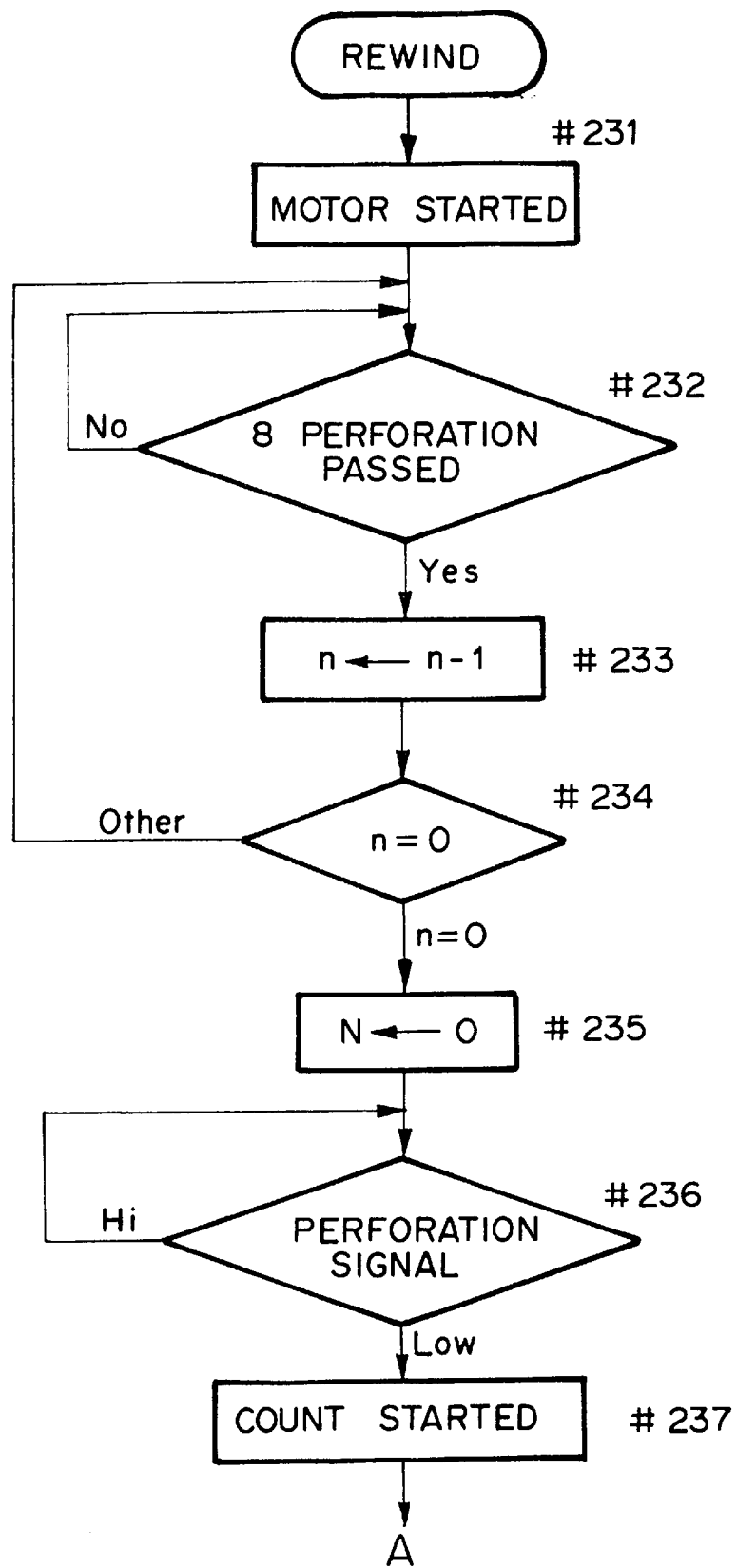
FIGS. 25 and 26 show a flow chart for illustrating the routine for controlling film rewinding in the camera of the modification.
Figure 26:
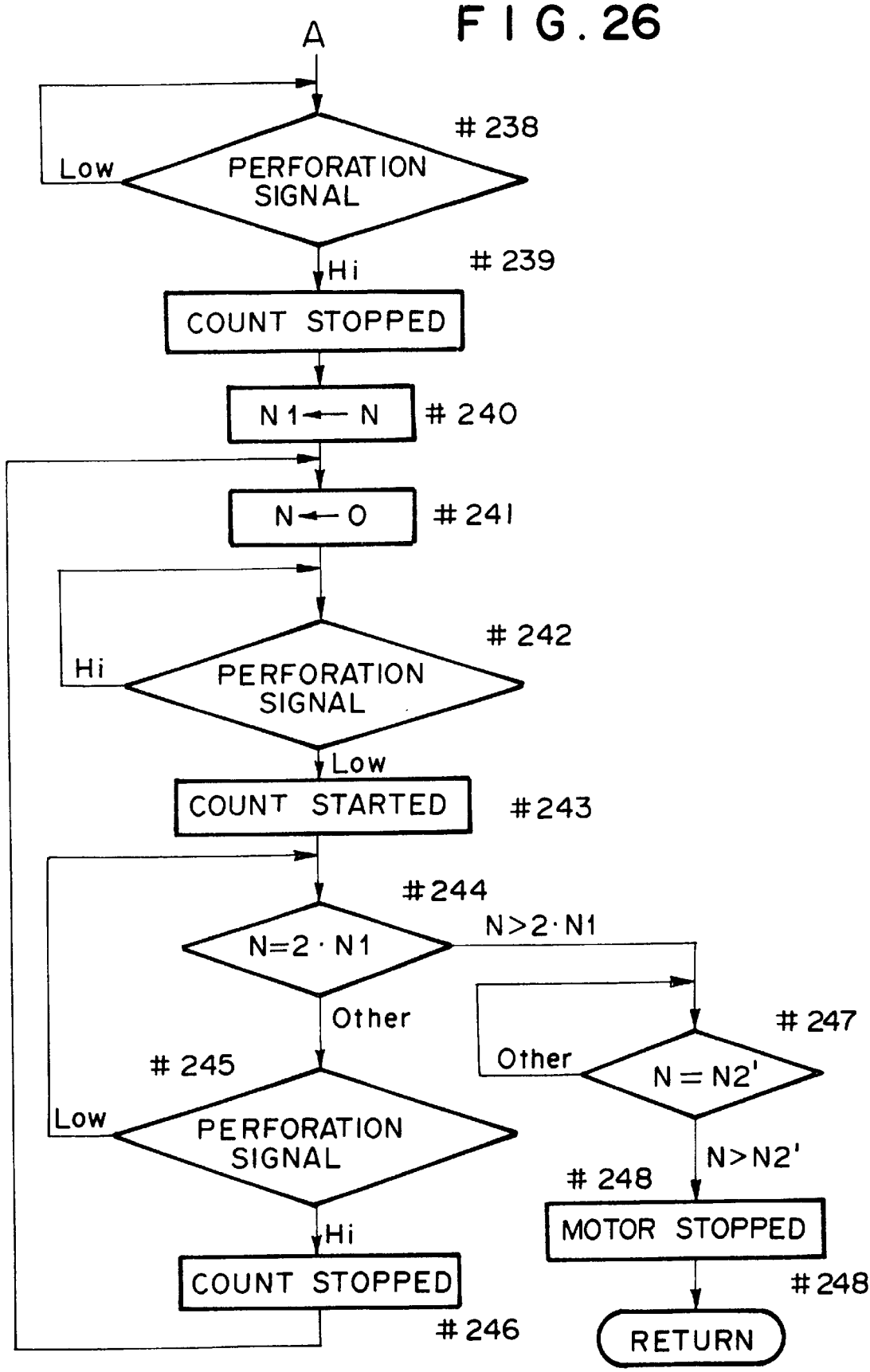

The present invention may be applied to a conventional 135 film magazine (35 mm film magazine) indicated at 210' in FIG. 24. Another modification of the embodiment shown in FIG. 19 will be described with reference to FIG. 24 to 26, hereinbelow. This modification is substantially the same as the embodiment shown in FIG. 19 except that the bar code detector 231 and the bar code detecting circuit 230 are not necessary and the routine for stopping the motor is different from that shown in FIGS. 21 and 22. In FIG. 24, the parts analogous to those shown in FIG. 19 and 20 are given the same reference numerals provided with a prime and will not be described here.

FIG. 24 shows the relation between film rewinding and the perforation signal and the pulse signal. In this modification, eight perforations 214 are formed per one frame of the film 211'.

When film rewinding operation is automatically or manually started, the motor 261' is driven in the film rewinding direction by the motor driver 260'. (step #231) Then the microcomputer 220' waits for the photosensor 251' to detect eight perforations 214 (step #232).

When eight perforations are detected, i.e., when the film 211' is rewound by the one frame length, the count of the frame counter n is decremented by one. (step #233) Steps #232 and #233 are repeated until the count of the frame counter n becomes 0. (step #234)

When the count of the frame counter n becomes 0, the count of the pulse counter N is reset to 0. (step #235) Then the number of the pulse signals detected by the photosensor 251' while the perforation signal is at low level per one perforation 214 is counted. That is, the rotational angle of the motor 261' required for one perforation 214 to pass the photosensor 251' is detected. (steps #236 to #239) The number of the pulse signals is stored as a constant N1 for distinguishing the leading end 212' of the film 211'. (step #240)

Thereafter the pulse counter N is reset to 0 again (step #241) and the number of the pulses is counted each time the perforation signal turns low (steps #241 and #242). The number of the pulses thus counted is compared with double the constant N1. (step #244) When it is determined that the former is not larger than the latter, it is determined that a perforation has been detected or that the leading end 212' does not pass the photosensor 251' yet, and steps #241 to #245 are repeated. On the other hand, when it is determined in step #244 that the former is larger than the latter, it is determined that the leading end 212' has passed the photosensor 251' and the motor 261' is stopped when the count of the pulse counter reaches a predetermined count N2'. (steps #247 and #248)

The number N2' of the pulses to be output from the rotary encoder 281' when the film 211' is rewound by the length L' (FIG. 24) has been empirically determined and stored in the ROM. Thus when the count of the pulse counter N reaches the number N2', it is determined that the film 211' has been completely rewound into the magazine body and the motor 261' is stopped.

As the roll diameter (the diameter of the roll of film around the spool) increases, the length by which the film 211' is rewound per one rotation of the motor 261' increases. Accordingly the number N2' of the pulses to be output from the rotary encoder 281' when the film 211' is rewound by the length L' should be determined on the basis of the length by which the film 211' is rewound per one rotation of the motor 261' just before film rewinding is ended.

The effective roll diameter just before film rewinding is ended differs depending on the number of exposure frames of the film. Accordingly the number N2' should be determined on the basis of a minimum effective roll diameter (e.g., for the 12 exposure film).

However when the number N2' is set for the minimum exposure film, film rewinding is completed before the count of the pulse counter N reaches the number N2' and the motor 261' is driven in vain after completion of film rewinding. In order to avoid such a vain operation, it is preferred that the number N2' be set as a variable which is calculated on the basis of the length $L_{PF}$ of one perforation, the value of said constant N1 just before detection of the leading end 212' of the film 211' and the length L'. That is, $N2'=N1 \times L'/L_{PF}$.

By setting the number N2' in this manner, a vain operation of the motor 261' can be avoided irrespective of the number of exposure frames.

What is claimed is:

1. A photographic camera comprising
   a film rewinding means for rewinding a roll film into a film magazine body,
   a film end detecting means which detects the leading end of the film in the course of rewinding,
   a driving amount detecting means which detects the amount of drive by which the rewinding means is driven,
   a target driving amount calculating means which calculates a target amount of drive by which the rewinding means is to be driven after the leading end of the film is detected by the film end detecting means to completely rewind the film into the magazine body, and
   a rewind control means which causes the rewinding means to stop rewinding the film on the basis of comparison of the target amount of drive calculated by the target driving amount calculating means with the amount of drive of the rewinding means detected by the driving amount detecting means after the leading end of the film is detected by the film end detecting means.

2. A photographic camera as defined in claim 1 in which said rewind control means causes the rewinding means to stop rewinding the film when the amount of drive of the rewinding means detected by the driving amount detecting means after the leading end of the film is detected by the film end detecting means reaches the target amount of drive.

3. A photographic camera as defined in claim 1 or 2 in which said driving amount detecting means detects the amount of drive of the film rewinding means by counting encoder pulses which are generated every predetermined angle rotation of an encoder which is rotated together with the rewinding means.

4. A photographic camera as defined in claim 1 or 2 in which said film magazine is provided with a data disk which carries bar codes representing information inherent to the film magazine such as the ISO sensitivity, the number of exposure frames and the like of the film and is rotated together with the spool, and said driving amount detecting means detects the amount of drive of the film rewinding means by detecting the rotational angle of the data disk.

* * * * *